United States Patent [19]
Maples et al.

[11] Patent Number: 5,914,720
[45] Date of Patent: *Jun. 22, 1999

[54] METHOD OF USING MULTIPLE PERCEPTUAL CHANNELS TO INCREASE USER ABSORPTION OF AN N-DIMENSIONAL PRESENTATION ENVIRONMENT

[75] Inventors: Creve Maples; Craig A. Peterson, both of Albuquerque, N.M.

[73] Assignee: Sandia Corporation, Albuquerque, N.M.

[ * ] Notice: This patent issued on a continued prosecution application filed under 37 CFR 1.53(d), and is subject to the twenty year patent term provisions of 35 U.S.C. 154(a)(2).

[21] Appl. No.: 08/717,742

[22] Filed: Sep. 23, 1996

Related U.S. Application Data

[63] Continuation of application No. 08/230,802, Apr. 21, 1994, abandoned.

[51] Int. Cl.⁶ .................................................. G06T 17/00
[52] U.S. Cl. ........................... 345/419; 345/156; 345/978
[58] Field of Search ..................................... 395/153, 154, 395/155, 157, 806, 807, 119, 978; 345/302, 419, 427, 978, 156

[56] References Cited

U.S. PATENT DOCUMENTS

| | | | |
|---|---|---|---|
| 5,179,700 | 1/1993 | Aihara et al. | 395/650 |
| 5,234,346 | 8/1993 | Rice | 434/316 |
| 5,287,102 | 2/1994 | McKiel, Jr. | 340/825.19 |
| 5,320,538 | 6/1994 | Baum | 395/152 X |
| 5,327,529 | 7/1994 | Fults et al. | 395/155 |
| 5,461,711 | 10/1995 | Wang et al. | 395/154 X |
| 5,680,524 | 10/1997 | Maples et al. | 345/427 |

OTHER PUBLICATIONS

Classified Search and Image Retrival for the Automated Patent System Student Manual, pp. 1–2 through 1–4 and 9–3, Nov. 1990.

Blattner et al., "Multimedia Environments for Scientists", IEEE Visualization 1991 Conference, pp. 348–353.

Legensky, "Interactive Investigation of Fluid Mechanics Data Sets", IEEE Visualization 1990 Conference, pp. 435–439.

*Primary Examiner*—Mark K. Zimmerman

[57] ABSTRACT

A multi-dimensional user oriented synthetic environment system allows application programs to be programmed and accessed with input/output device independent, generic functional commands which are a distillation of the actual functions performed by any application program. A shared memory structure allows the translation of device specific commands to device independent, generic functional commands. Complete flexibility of the mapping of synthetic environment data to the user is thereby allowed. Accordingly, synthetic environment data may be provided to the user on parallel user information processing channels allowing the subcognitive mind to act as a filter, eliminating irrelevant information and allowing the processing of increase amounts of data by the user. The user is further provided with a craft surrounding the user within the synthetic environment, which craft, imparts important visual referential an motion parallax cues, enabling the user to better appreciate distances and directions within the synthetic environment. Display of this craft in close proximity to the user's point of perspective may be accomplished without substantially degrading the image resolution of the displayed portions of the synthetic environment.

26 Claims, 22 Drawing Sheets

FIG. 9(D)

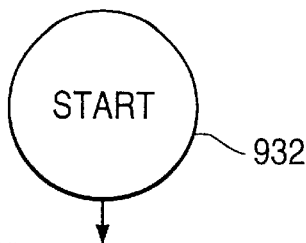

```
beta = lock_pitch + (3D_input_z * MAX_BETA)

if( craft_is_upside_down)
    alpha = lock_yaw - (3D_input_x * MAX_ALPHA)
else
    alpha = lock_yaw + (3D_input_x * MAX_ALPHA)
endif r = lock_radius + (3D_input_y * speed)
if( r < 0.0 )
    r = 0.0
endif lock_radius = r
lock_yaw = alpha
lock_pitch = beta craft_x_position = tethered_x_position
craft_y_position = tethered_y_position
craft_z_position = tethered_z_position craft_yaw = 360 - tethered_object_yaw
craft_pitch = 360 - tethered_object_pitch
craft_roll = 360 - tethered_object_roll
```

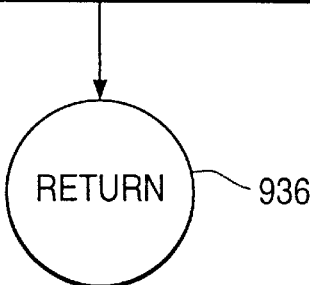

METHOD OF USING MULTIPLE PERCEPTUAL CHANNELS TO INCREASE USER ABSORPTION OF AN N-DIMENSIONAL PRESENTATION ENVIRONMENT

This application is a continuation, of application Ser. No. 08/230,802 filed on Apr. 21, 1994, now abandoned.

FIELD OF THE INVENTION

The present application is generally directed to improvements in the interaction between the computer users and their application programs via input/output devices. The present application further generally relates to improvements in multi-dimensional synthetic environments which allow the user to more easily navigate through and work in such environments.

BACKGROUND OF THE INVENTION

Recently, there has been great interest in so called "Virtual Reality" where a user navigates through and works in a multi-dimensional, typically a three dimensional, visual environment. In such systems, information is provided to the user so that the user visually perceives multi-dimensional information. When a user navigates through such a multi-dimensional synthetic environment, it has previously been difficult to locate the user's perspective within the environment in a way that the user can operate comfortably and efficiently. In a typical synthetic environment, several problems are encountered which relate to the difficulty in comfortably placing the user within the multi-dimensional environment so that the user feels comfortably a part of the environment and can understand the spacing and relationship of objects with respect to the user's perspective point.

It has been said that the purpose of "Virtual Reality" is to "break the screen" and place the user in the space with the information being visualized. Virtual reality further seeks to eliminate the computer as the apparent intermediary, and to permit humans to interact directly and naturally with the artificial environment. Enhancing a persons ability to rapidly find and understand the critical relationships contained in complex, multi-dimensional information is an important objective in the development of such programs.

The synthetic environmental systems heretofore developed have been somewhat difficult to navigate through and work in as such prior synthetic environments did not provide sufficient perceptual clues to ensure that the user will be able to comfortably ascertain the user's perspective point, distance and relative direction to perceived objects, and rate of movement of objects within the synthetic environment. While it is true that some synthetic environments provide a "dashboard" which provides the user with certain information through gauges and the like, and which suggests that the user's point of perspective originates at the base of the display, such dashboards cannot provide a sense of scale and perspective necessary to perceive distance as well as direction nor do systems utilizing such "dashboards" impart head motion parallax cues necessary to perceive the relative motion in the synthetic environment between the user and adjacent objects. Further, such systems have not allowed a user perspective and viewpoint which is directionally and positionally independent of user direction of movement. As used in this application, "user perspective" refers to the user's apparent direction of view within the synthetic environment while "user's point of perspective" or "viewpoint" refer to the point from which the user perspective originates, the apparent point from which the user views the synthetic environment.

Such prior synthetic environmental systems also create difficulties in the grasping and manipulation of objects in the synthetic environment. Because distance and movement are difficult to perceive in such prior systems, it has been heretofore difficult to grasp and manipulate objects within such synthetic environments. Such prior systems typically do not attempt to connect the system's grasping mechanism to the user's point of perspective. For example, some prior synthetic environments utilize a "floating hand" disconnected from the user's point of perspective, for grasping desired objects. Such a "floating hand" typically controlled by a data glove or the like is disconcerting to use as it does not appear connected to the user's point of perspective.

Over the last decade, the sophistication of scientific models and experiments have rapidly increased. As the complexity of such modelling increases, it becomes more difficult to extract and understand the information contained in such computational and experimental models. The analysis of experimental information may take months or even years to analyze and understand in many scientific fields. To simplify the analysis of such experimental information, it is accordingly desirable to produce more effective human-computer interfaces to significantly improve a persons ability to explore, interact with, perceive and understand computer based information.

Historically programming languages and operating systems were developed to help insulate the application programmer from the hardware details of the computer architecture. The use of such operating systems simplify the migration of application programs from one computer platform to another.

Developers of virtual, or synthetic environments, so called "Virtual Reality" encounter a wide variety of differing display devices such as head mounted stereoscopic displays, which optionally may be connected to a position and direction resolving boom support, flat screens or other forms of display. Similarly, synthetic environments may utilize a number of input devices such as data gloves, spaceballs, joy sticks, keyboards and the like. It has been heretofore necessary to develop a synthetic environment for particular input and output devices which can, of course vary, depending upon user applications and requirements. Such synthetic environmental systems must therefore be programmed to respond to and drive the particular inputs and outputs of an individual application.

The present invention overcomes the above-mentioned disadvantages of the known prior art systems. The present invention provides a user oriented synthetic environment interface which maps any selected input and output devices to a synthetic environment or application program using standard, device independent, generic functional commands or descriptors. Through the use of the multi-dimensional user oriented synthetic environment of the present application (known as MUSE), a synthetic environment or application program may be used with any desired set of input and output devices. Accordingly, the designer of the synthetic environment or applications program need not consider how a user moves around the model or issues commands. Instead the designer of a particular synthetic environment or application program need only describe the desired user input/output interfacing functions using standardized, device independent, functional commands. The system of the present application allows the user to select the mapping of such standardized functional commands to desired input and output devices to free the creator of these synthetic environment or application programs from the need to identify specific input/output devices, and further to allow the user to increase his/her rate of information absorption by mapping information transferred to/from the synthetic environment or application program through multiple perceptual channels.

The system of the present application further provides a craft surrounding the user's apparent position which craft may be moved independently of user perspective or viewpoint. The use of such a craft provides important visual clues to the user, enhancing the user's ability to perceive both distance and motion within the synthetic environment. The present application accordingly describes the development of a set of display elements, including a craft, which provide perceptual distance and relative motion clues to the user to make the user's navigation through the synthetic environment increasingly comfortable and effective.

OBJECTS OF THE INVENTION

It is an object of the present invention to increase the informational transfer between a user and an application program.

It is an object of the present application to display and interact with a synthetic environment with complete device independence.

It is an object of the present application to identify input/output device independent generic functions and provide an interface between input/output devices and a synthetic environment or application program utilizing such generic functions.

It is a further object of the present invention to facilitate the development and processing of multi-variant (e.g., a three-dimensional surface which moves in time) models/data/information independent of the display devices or any specifics of available interactive devices, to provide software independence from the input/output devices.

It is another object of the present application to allow the standardization of application programs and synthetic environment data such that these programs respond to and generate input/output device independent, generic functional commands which allow a particular application program or particular synthetic environment data to be used with any input/output devices.

It is another object of the present invention to increase the information transfer volume between the user and application program or synthetic environment by mapping the input/output of information to an increased number of human sensory channels, thereby increasing the user's ability to communicate with the application program or synthetic environment.

It is another object of the present invention to enhance a persons ability to rapidly find and understand relationships within multi-dimensional information.

It is a further object of the present invention to provide a set of user perceptual visual clues which will enhance a user's ability to perceive distance and relative movement within a synthetic environment.

It is a still further object of the present invention to decouple a user's direction of apparent movement through the synthetic environment from the user's view point to allow independence between user movement and direction of view within the synthetic environment.

It is a further object of the present invention to abstract and separate the functional and real time aspects of human-computer interaction, allowing dynamic flexibility of selection and assignment of input/output devices, simplifying the task of model construction or data base preparation.

It is a further object of the present invention to provide a distributed system architecture for constructing a synthetic environment which allows multiple users to share in/or network to interactively and simultaneously examine information within the synthetic environment.

It is a further object of the present application to display detail of the craft without substantially reducing the resolution of the synthetic environment.

It is an object of the present invention to implement the above mentioned functions with multiple processors using a shared memory to enhance real-time operational speed of applications programs operating within a synthetic environment.

These and further objects of the present invention will be apparent to those of ordinary skill in the art with reference to the following description and Figures.

SUMMARY OF THE INVENTION

The multi-dimensional, user oriented, synthetic environment (MUSE) system of the present application is an open real-time shell for interfacing applications programs and synthetic environmental data to user inputs and outputs, in real time, in a simplified manner. The system of the present application allows application programs to be programmed and accessed with input/output device independent, functional commands which are a distillation of the actual functions performed by any application program in a computer system, particularly one providing a synthetic environment to the user.

The present invention allows for real-time operation which is device independent. The system of the present application may be implemented using one or more processors communicating through a physically shared memory. The shared memory structure decouples device and program operation and greatly simplifies the creation of application programs and the interaction between various selected user input/output devices and any application program. A variety of functions may be easily implemented by an application program through device independent functional input/output commands which may be provided to/from the user through a variety of input/output methodologies including speech recognition, voice synthesis, data sonification, visual displays, tactile and force feedback, and bioelectric and magnetic sensors.

Complex, multi-parameter information often arises experimentally from a variety of sensors or measuring devices, or computationally from the results of computer calculations or models. Investigating and understanding the content of such information is currently a major difficulty in the road between basic research and the actual application of the results. There is a considerable continuing effort to develop computer software and architecture which can, to some extent, mimic the logic operations of the mind (e.g. artificial intelligence and neural networks). While a computer excels at performing routine types of computation, it is relatively inefficient at subjective problems such as pattern recognition and complex decision making. The mind, on the other hand, is the most advanced device for information and pattern recognition. The human senses are superbly designed to collect, correlate and analyze continuous streams of information, discarding irrelevant information quickly and making intuitive connections.

Visualization is an important methodology to communicate information to a computer user. Visualization enables researchers to observe their simulations. However, as increasing information is provided by a visual display, the ability of the user to process this visually provided information becomes a limiting factor. However, the human mind is not merely limited to the cognitive processing of information from a visual display. For thousands of years, the human mind has sub-cognitively processed information on multiple sensory channels. For example, the human mind simultaneously processes taste, hearing, visual information, via sight, as well as a variety of types of tactile information. The primary purpose of the sub-cognitive levels of the human mind is to eliminate irrelevant information. The sub-cognitive processing performed within the mind eliminates irrelevant information, supplying only relevant information to the attention of the cognitive mind. Thus, the sub-cognitive mind acts as a form of filter, eliminating irrelevant information, and allowing the processing of vast amounts of data.

The human mind functions in this manner on a continual basis. For example, when driving in traffic, the sub-cognitive mind would compute an instantaneous norm of the traffic flow. If one car were to slow down or deviate spatially from normal flow, it would become an anomaly, and would be brought to the attention of the cognitive mind. When there is no deviation from normal traffic patterns, the sub-cognitive mind continually dispenses with such data and does not bring it to the attention of the cognitive mind. In essence, the sub-cognitive mind is constantly computing norms for a variety of types of data and dispensing with the data unless it deviates sufficiently from the norm.

The system of the present invention allows any applications program to make use of the brain's normal sub-cognitive processing to increase the amount of information that may be considered by a user. The system of the present invention allows such sub-cognitive processing of information by allowing application program produced outputs to be flexibly mapped to desired input/output devices. For example, suppose an engineer wants to model the performance of a circuit in an adverse environment. The engineer wishes to monitor circuit currents, thermal loading, and vibration information at various points in the circuit. If the engineer tries to assimilate these three types of information using only the visual display, the engineer's cognitive processing of these three types of information will be easily overloaded. However, using the system of the present application, the engineer may easily map one of these three information sets to, for example, an audible tone. For example, the engineer could output the temperature of a critical circuit element to a sound generator which generates an audible tone. The engineer thereafter monitors the model visually for currents and vibrational loading but monitors thermal load audibly. The sub-cognitive processing of the engineer's brain can easily filter out the sound of "normal" temperatures and will quickly bring the engineer's attention to device temperature only when that temperature exceeds a normal range, which the engineer's mind will easily notice sub-cognitively and bring to the attention of the engineer's cognitive mind.

It is accordingly apparent that, by mapping information to alternative user processing channels, the system of the present invention allows a user to substantially increase the amount of information effectively transferred to the engineer by the computer model or simulation.

The system of the present application has a further advantage in that it allows any input/output devices to be used with any application program. For example, the system of the present application may produce data indicative of the visual orientation of the user. This data is provided to the application program without regard for the type of device which generates this information. This information could be generated from a joy stick, six degree of freedom mouse, or any other suitable input device, including those which would be designed after the application program was written.

The system of the present invention merely tells the application program functionally where the user is looking, translating the information provided by any input into a functional description of the user's perspective. Similarly, the system of the present invention can generate any suitable visual output for a given perspective of the synthetic environment. The application program merely needs to tell the user interface system of the present application that the user is looking with a particular user perspective from a particular viewpoint using device independent functional commands. The system of the present invention uses this information to generate appropriate 3-dimensional stereo pictures, or a single flat panel image, or it can map the output of the application program into sound, into force feedback, or any other suitable form of display.

The system of the present invention transfers input/output commands through a physically shared memory interposed between the application program and input/output devices. For example, a device processor may handle all device data and further may include a video processor to process video information to a video output device, a speech synthesizer for generating audible comments to the user, a voice recognition system to recognize individual user voice commands or any other input/output device including, for example tactile feedback devices. This input/output device processor is coupled to the physically shared memory and provides device independent functional commands to an appropriate portion of the physically shared memory. The physically shared memory, in turn, is coupled to the applications program, and supplies device independent functional commands to the application program, communicating on a functional level.

The applications program generates functional commands and data for transmission to the MUSE shell which then maps functional commands and state information to the functional layer of the physically shared memory. The change in status of information provided within the data level is then used by the input/output device processor which converts these device independent commands to the desired device specific commands of selected output devices. The input/output device processor translates this application of status data which comprises device independent functional commands and status information into outputs for specific devices. Similarly, input device information provided to the input/output device processor is converted by the input/output device processor into functional command data which is stored in the physically shared memory. The physically shared memory is an important part of the success of operating the system of the present invention in a real-time fashion.

The present application is further directed to improving the visual clues provided the user during display of the synthetic environment. As mentioned above, one difficulty in prior synthetic environments is the difficulty in determining perspective and distance with the known prior systems. In accordance with the teachings of the present application, the user's view point is identified by a "craft" within which the user normally resides.

This craft provides important visual clues to the user. The craft prevents the user from feeling disembodied within the synthetic environment by giving the user a reference frame with which to gauge distances and directions. This craft provides a common referential point within the synthetic environment and its function is to provide visual referential clues similar to those provided to the driver of an automobile by the hood of the car. The craft is transparent to avoid obscuring important elements of the synthetic environment and provides a reference from which to gauge speed and distance, providing important motion parallax clues to render navigation within the synthetic environment more comfortable and efficient. The craft displayed in the system of the present invention further includes transparent craft walls on which important information may be displayed. Typically, one (the left) wall is utilized to display instrumentation (e.g., navigational) information including a map indicating the relative position of the craft within the synthetic environment. Time base and velocity information is also typically displayed on this wall. Another wall of the craft is typically used to display ancillary information or data requested by the user and typically associated with the synthetic environment. For example, as illustrated in the video drawing 20V, computer aided tomographic (CAT) data is illustrated on the right wall data display.

An important feature of the system of the present application allows the user's viewpoint to be varied independent of craft position and direction. Thus, in accordance with the teachings of the present application, the user's perspective and viewpoint is independent of user motion through the synthetic environment.

According to the teachings of the present application, the user has complete control over how to interact through various input/output devices, with the model, how to explore the space, how to issue commands, and even which physical devices to use in the functions they serve. The system of the present invention allows the user to more easily present information to the application program or synthetic environment model as well as to explore and navigate through the environment and manipulate and examine elements within the environment. Each of these functions is fully customizable in accordance with the teachings of the present application.

Another important feature of the present application is the ability of the MUSE system of the present application to maximize the detail in the display of the synthetic environment while simultaneously displaying detail of the craft. This is a difficult accomplishment as the fixed bit resolution of the projection of the information within the synthetic environment onto a display image makes it highly desirable to set the least and greatest distances for the viewing volume as closely as possible to achieve maximum viewing resolution. The viewing volume is defined as a right frusto-cone in which the frustrum is defined by the least distance and the base of the cone is defined by the greatest distance. Since a graphical processing system will have a fixed number of bits from which to project the information within the viewing volume onto a display, the greater the distance between the least and greatest distances, the lower the image resolution. The least and greatest distances define clipping planes which are, in the preferred embodiment, periodically redefined, so that the relevant object data within a synthetic environment is closely surrounded by the least and greatest distance clipping planes. Thus, it is important to define the least clipping plane as closely as possible to the nearest object of interest within a synthetic environment so as to increase image resolution.

Unfortunately, while as described above, a craft is extremely desirable to provide a common referential point and motion parallax clues to the user of the MUSE system of the present invention, displaying the craft creates substantial problems as the display of craft features close to the user's viewpoint is inconsistent with the objective of maximizing image detail by defining the least distance clipping plane as far away from the user viewpoint as possible. In order to accomplish these divergent goals, Applicants have further invented a system for displaying the craft without substantially degrading image detail. This is performed by generating a craft image which is separate from the image of the relevant features within the synthetic environment. The craft image is generated by using least and greatest distance clipping planes which extend from a least clipping plane immediately adjacent the user viewpoint to a greatest distance clipping plane extending just beyond the periphery of the MUSE craft. A craft image is then developed using the same user viewpoint and perspective used to develop corresponding synthetic environment image data. The two images are then overlaid immediately prior to display so that the craft may be displayed without substantially degrading the resolution of the image of objects within the synthetic environment. This process is yet another important feature of the present application.

The MUSE system allows an application program, model or data to run on various hardware platforms. Since the MUSE input and output functional levels access the MUSE application only with device independent generic functional commands, an application may be moved from system to system with platform independence.

A MUSE application program, model or data may make a call to the MUSE system to use MUSE system parameters to limit or control the functionality of certain portions of the application program, model or data. Since the application program accesses the MUSE system to control functionality of the application, the user is then able to trigger application functionality by selected inputs.

BRIEF DESCRIPTION OF THE DRAWINGS

The present invention will be more fully understood with reference to the attached drawing Figures wherein:

FIG. 9(D) is an illustration of the MUSE lockcraft algorithm.

DETAILED DESCRIPTION OF THE PREFERRED EMBODIMENTS

The construction operation of the present invention will now be described in detail with reference to the above-mentioned drawing Figures. Like elements in the figures are given the same numeric identifiers.

As previously mentioned, the MUSE system is a user interface system which resides between an application program, model, or data 18 and the user input/output devices, allowing the application program, model, or data to interface with the user solely through the use of generic functional commands which are, in the preferred embodiment, completely independent from the nature and type of input and output devices utilized. Typically, such an application program, model or data would include multi-variant data and one or more routines for accessing and acting on or modifying such data. However, any N-dimensional data may be manipulated by the MUSE system of the present application.

The Functional Operation of the MUSE System

Figure 1:
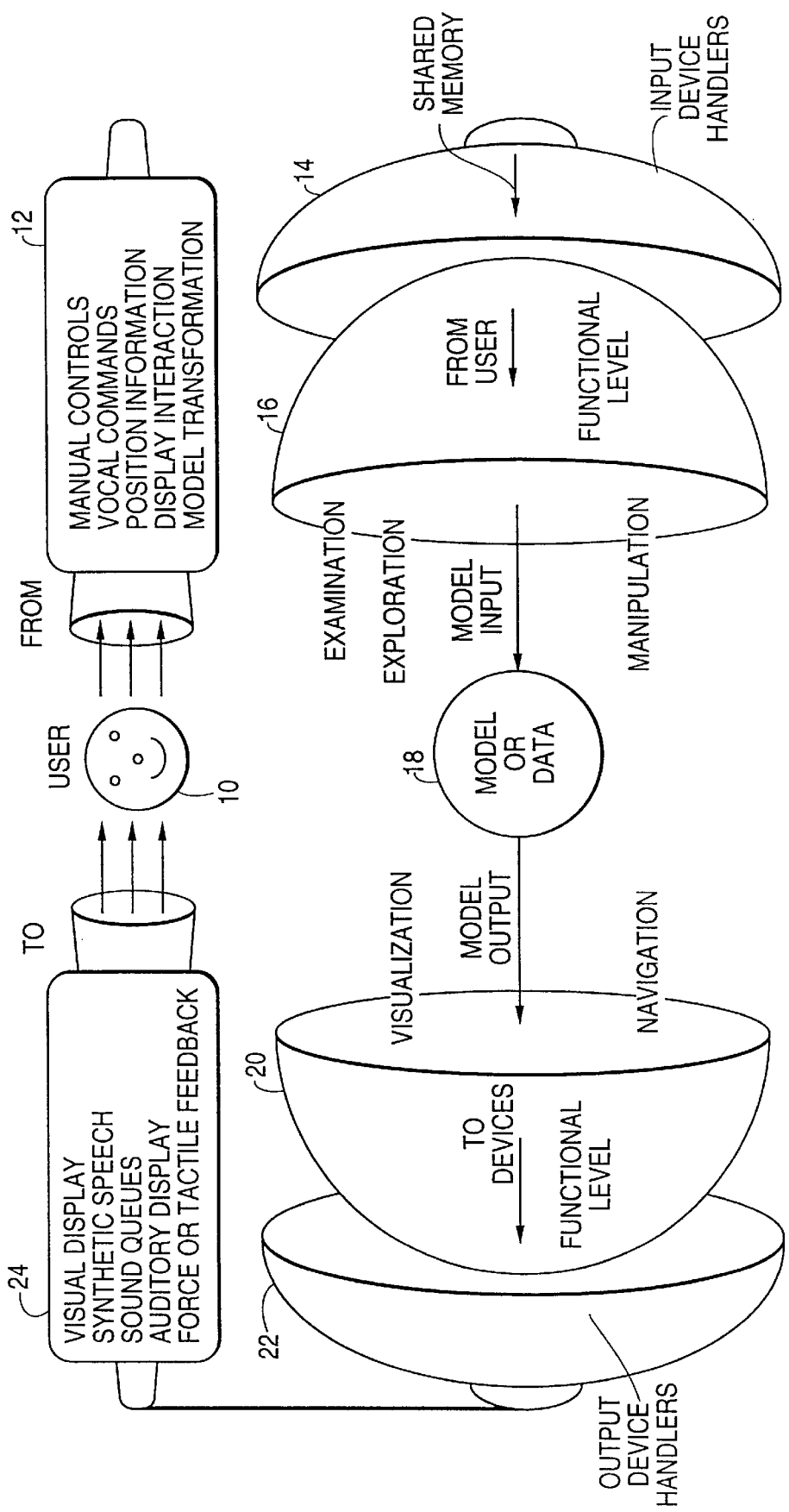
FIG. 1 is a representational illustration of how the MUSE system of the present application interfaces between a synthetic environment model or data and the user.

FIG. 1 generally describes the functional arrangement of the MUSE system of the present application, in which a user 10 may supply commands to an input section 12 which section, in hardware terms, may include one or more input devices which generate device specific input commands. For example, as illustrated in FIG. 1, a variety of input types may be used by the user to interface the MUSE system of the present application. The input section 12, including a variety of input devices and produces input device specific instructions and commands which are converted by one or more input device handlers 14 into device independent functionality triggers which are stored in a physically shared memory. Although not required, in a typical embodiment of the present application, the input device handlers 14 would be implemented by an input device processor different from the processor which processes the application program.

An input functional level 16 draws the device independent functionality triggers from the physically shared memory and performs additional processing on the device independent functionality triggers to develop device independent generic functional commands which are provided to the application program, model or data 18. While such N-dimensional information is typically three-dimensional visual data, the application program, model or data 18 may contain 4 or even greater dimensions and the data is, of course, not limited to visual data. The processing by the input functional level 16 of the input of the device independent functionality triggers called from the physically shared memory (e.g., time and distance scaling of the input data), as well as imparting any input functional conversions of the input information due to MUSE borne conditional instructions or the like.

Typically, model inputs will include commands to facilitate the examination of the multi-variant data representative of the synthetic environment produced by the application program, model or data 18. The examination function allows the user to perceive the N-dimensional data, typically at least in part, through a video display. The examination function also allows the overlay of information which allows the user to enhance this examination function. The examination process includes correlating and understanding the N-dimensional information contained in the application program, model or data 18 and thus, may be performed, in part, through the use of correlation filters, transformations, or the like. For example, a correlation filter may be provided for the user by the application programmer or the MUSE shell to locate and display those surfaces of an electronic circuit model which have a temperature greater than 50° C. A transformation may be performed by the application program to, for example, by performing logarithmic scaling of a dimension in N-space. These functions are performed by making functional calls to MUSE from the application program. The capability of using voice feedback (rather than text output) may be utilized to aid the examination process by providing non-visually distracting information to the user.

In addition to examination of the application program, model or data 18, exploration functions may also be implemented. The MUSE system of the present application provides techniques for moving through N-space, both inter- and intra-dimensionally. For example, the MUSE system of the present invention allows the user to utilize a virtual craft which may be manoeuvered through the N-space using any desired input devices, so that the user's viewpoint and perspective changes, as desired. The exploration functionality of the MUSE system of the present application further allows the customization of any parameters of N space to be presented visually, aurally and tactilely through vibration or the like. The virtual craft allows the mode of movement within any visual model to be dynamically selected by the viewer. The user may specify the physical control devices according to user preference. Time control and spatial scaling functions further enhance this exploration function.

The final input functionality is manipulation. Manipulation includes interaction with the display and visual information. The MUSE system provides control mechanisms for interacting with the information base. Techniques are used for altering and moving objects or displays, for selecting options and issuing commands, or for choosing particular objects or information. A tethering capability is desirably included which permits viewers to dynamically attach themselves to any object in the model. If the object is in motion, the user is locked into motion with the object. While tethered, the user is still completely free to move both the viewpoint and user perspective while tethered, allowing examination of the object or the world as seen from the object. Voice commands, data-gloves, head-tracking and tactile feedback may be utilized to facilitate manipulation.

As mentioned above, the MUSE system's input to the application program, model or data 18 is in the form of device independent generic functional commands. An exemplary list of terms for the generic functional commands are attached hereto as Appendix A. Of course the application program, model or data 18 provides model data to the MUSE system which may desirable be used by the MUSE system to produce output displays, including desirably one or more visual displays. Accordingly, the application program, model or data 18 provides model output, once again in the form of device independent generic functional commands, to an output functional level 20 which converts these device independent functional commands into device independent functionality triggers which are provided to the physically shared memory for storage therein. The device independent generic functional commands are processed by the output functional level 16 including time and distance scaling of the information output from the application program, model or data as well as any imparting any output functional conversions resultant from MUSE borne conditional instructions or the like.

The device independent functionality triggers stored within the shared memory are then accessed by output device handlers 22 which receive the device independent functionality triggers from the shared memory, mapping the device independent functionality triggers into device specific outputs to be provided to an output section 24 including one or more output devices such as stereoscopic visual displays, synthetic speech generators, force or tactile feedback devices, or any other device designed to supply desired information to a user.

The functional commands supplied by the application program, model or data 18 to the output functional level 20 in accordance with the system of the present application include a broad visualization or presentation function which interfaces the application program, model or data 18 with the user through various approaches for displaying complex, N-dimensional information. For example, the visualization function may transform data elements to objects, may translate visual displays into sound or other types of outputs, and allows multimedia immersion of the user in the application program, model or data including the use of an increased number of independent user sensory channels so that greater information transfer from the application program, model or data 18 to the user 10 may be effected. This visualization or presentation functionality may include the generation of multiple three or four dimensional images, traveling "sticky displays" (displays formed on the craft walls which travel about the synthetic environment with the user), N-dimensional radar, N-dimensional strip charts, or the like. This visualization or presentation functionality further includes the generation of desired information on the left and right hand walls of the craft as will be later explained in the instant application. However, complete flexibility in the manner in which data is conveyed to the user is provided. Auxiliary display areas on the left and right hand walls of the craft can be used, at the user's option, to display various two or three-D information in a manner to be later described which avoids unnecessary concealment of the user's view of the synthetic environment.

Navigation is the final generic functionality performed by the MUSE system of the present application. The MUSE system includes tools developed to assist viewers in maintaining location and reference in N-dimensional space. These include N-dimensional markers and automatic "you are here" maps. The N-dimensional markers typically comprise an icon which represents a unique position in N-dimensional space and an associated position pointer for referencing that unique position. Typically when a location within the N-dimensional space is marked, the position pointer is displayed somewhere on the craft walls where it can later be called to "teleport" the user to the unique position in N-space (including time) that it uniquely defines. Markers may be viewed or teleported to or from any location. The "you are here" or travel maps are typically displayed on an information wall of the craft and display the user's relative position within the N-dimensional space.

The system of the present application further includes a virtual camera and virtual video camera which permit the MUSE operator to recover videos or still frames from inside the synthetic environment. The virtual camera allows the user to take "snap shots" of the visual display, when desired. The virtual video camera allows a user to mark the beginning and the end of a portion of the user's navigation through the N-dimensional space and record and review the user's path and perspective at a later time.

The virtual video camera functions of the present application allows the user to first navigate the craft through the synthetic environment while recording the craft path and then subsequently repeat this pre-recorded path and then independently control the user's perspective during a second or subsequent pass through the synthetic environment allowing the user to view the environment with different perspectives in repeated passes along the same path. Subsequent passes may occur after significant changes to the model to enable the user to better understand how changes effect the model.

A MUSE application 18 provides a model and associated data to the MUSE shell. The application 18 also provides routine entry points as described in the various application modules of FIGS. 14–19 which enable interaction with the MUSE system and allows the MUSE system to provide sequence control to the application program, model or data.

Most application entry points are designed to aid in providing a single frame of graphics. An application program, model, or data may also need to provide a sense of where the viewer will be viewing in the next frame. The MUSE system provides the application with temporal and spatial information so that the application will know how to present the next viewing frame. Also, the application program may provide a graphics model for use by the MUSE shell. Lastly, the application may need to react to certain triggers or events generated by the MUSE shell. For these reasons, the application entry points of FIGS. 14–19 are provided within the application program, model or data 18. The application program, model or data 18 also initializes the MUSE system through an initialization entry point.

Since an application program, model or data provides the basic graphic model called by the MUSE system, model independence from the MUSE system is achieved. Any application program, model or data which utilizes the library of MUSE routines described in the instant application can be used in conjunction with the MUSE system. MUSE then adds its own graphics including the craft 400 into the scene to complete the scene and displays the scene to the desired outputs.

As previously described, the MUSE system allows an application to achieve device independence. This is accomplished by accessing the device independent functionality triggers stored within the application layer of shared memory which device independent functionality triggers are converted by the MUSE shell into device independent generic functional commands provided to the application program, model or data 18.

In order for the MUSE system to traverse the data stored within the application program, model or data, and perform mapping tasks within this application program, various pointers to the application data are used. A data start pointer is provided by the application program to provide a starting location for the application program's data. A shape description of the data(the type of data structure, e.g. array, list, tree, etc. and size) representing selected objects is also provided. Once the shape and data entry point are provided to MUSE, MUSE is then able to create surfaces and map application data to known devices in order to provide the user with complete access to the application program data.

Physically Shared Memory

Figure 2:
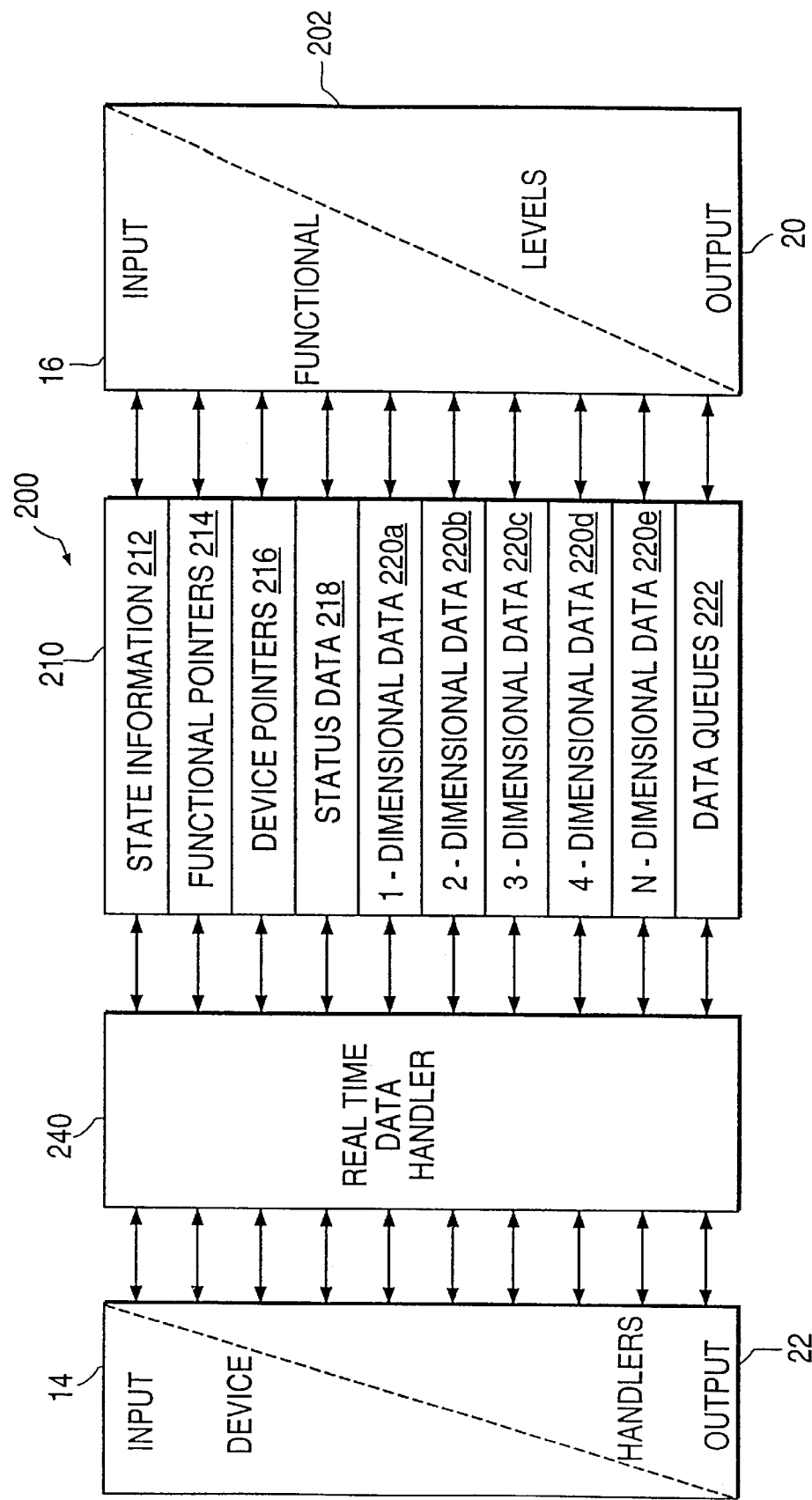
FIG. 2 is a schematic illustration of the manner in which the functional and device levels of the instant system interface with physically shared memory.

Referring now to FIG. 2, the function of the physically shared memory (generally indicated as 200) of the instant application will be more fully appreciated. The shared memory 200 includes a data level 210 which is information storage of the physically shared memory and which is divided into a plurality of data areas including a state information area 212, a functional pointer area 214, a device pointer area 216, a status data area 218, N-dimensional data areas 220A–220E, and an order dependent command data area 222. As will be explained in more detail with reference to FIG. 3 of the drawings, the input device handler 14 functions are typically performed by an input device processor which converts the device specific input commands into device independent functionality triggers. These device independent functionality triggers are stored in the functional level 210 in substantial realtime by a realtime handler 240. This realtime handler 240 similarly receives device independent functionality triggers from the functional level 210 to supply them to the requisite output devices via output device handlers 22 which are also part of the input/output device processor. State information and functional N-device pointers are stored in the data level 210 as well as status data and 1-dimensional to N-dimensional data. Additionally, the order independent command data area 222 receives order dependent values such as keyboard commands which provide information which is order dependent.

The device independent functionality triggers stored in the data level 210, while being device independent, are not generic functional commands such as those supplied to the application program, model or data 18. The difference is the data level 210 stores the actual states of the various input devices as device independent functionality triggers which may be modified by the input and output functional levels 16, 20 by time and distance scaling of the input/output data as we as by any imparting any input/output functional conversions and any processing of the input/output information due to MUSE borne conditional instructions or the like. For example, actuation of a momentary switch will indicate a state changing event, movement of a two-dimensional joy stick will produce X and Y values representative of the position of the joy stick, a three-dimensional joy stick will produce three values, while sensor arrays and other input devices may produce up to n correlated values. In other words, while the device independent functionality triggers are not the sort of generic commands seen by the program, they are device independent and merely provide the data produced by the individual input devices to the data level 210 of the physically shared memory 200.

The input and output functional levels 16 and 20 of FIG. 1 collectively correspond to the functional level 202 of FIG. 2 which functional level accesses the data level 210 asynchronously from the introduction and removal of data by the realtime handler 240. In a preferred embodiment of the present invention, the realtime handler and all input and output device handler functionality is performed by an input/output device processor which performs independently of a processor which performs the functional level of functionality of the input functional level 16 and output functional level 20 and which may also perform application program, model or data 18 processing functions. Alternatively, a separate processor may be used for application program, model or data processing functions. Further in the preferred embodiment, a separate video display processor is utilized to enhance system speed. The functional level 202 including the input functional level 16 and output functional level 20 receives calls from the application program, supplies necessary data information to the model, and processes model information for display, visually and otherwise, to the user.

An application program, model or data 18 is provided with an interface to shared memory so that it may access MUSE states, triggers, and events stored by the MUSE shell into the shared memory.

Figure 3:
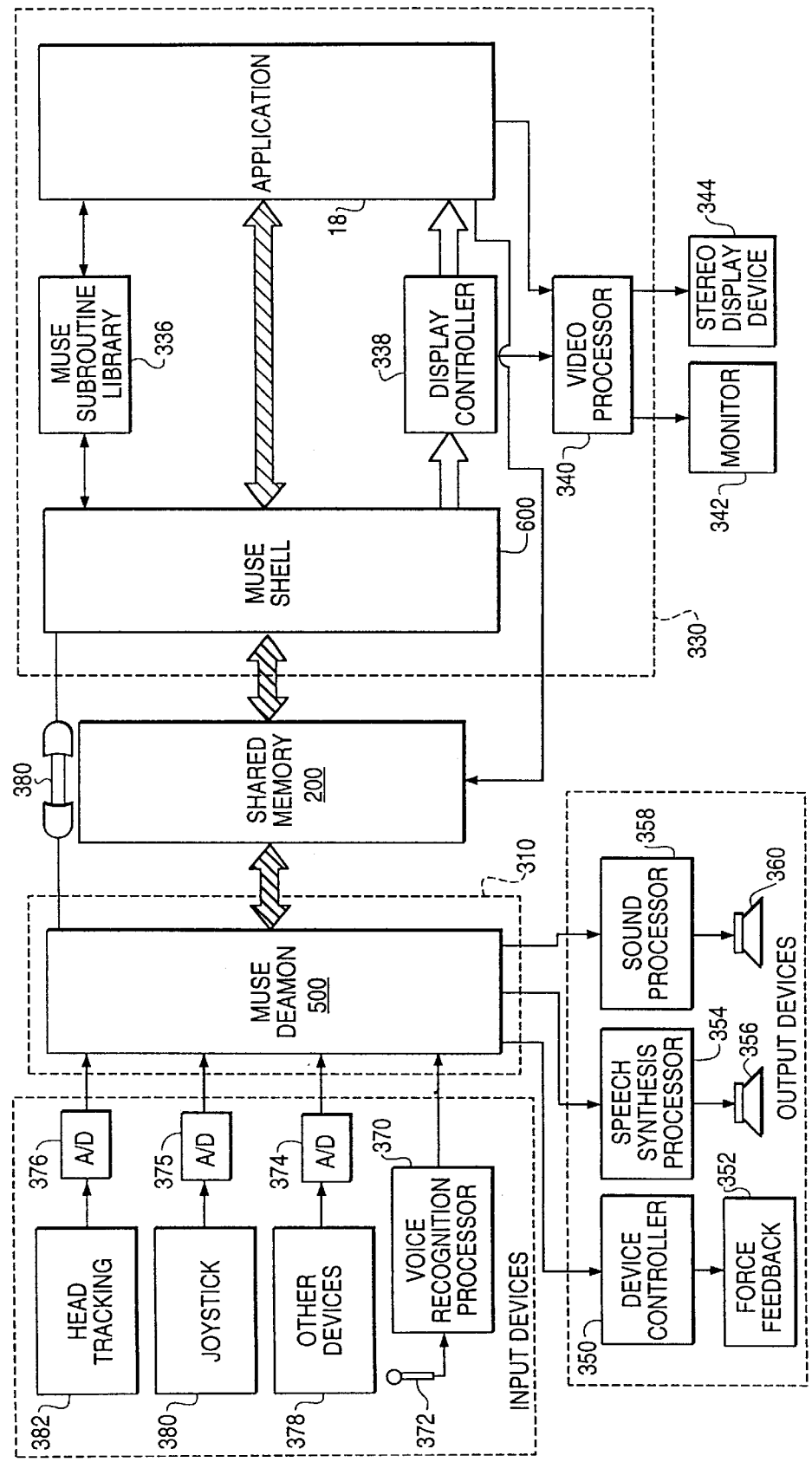
FIG. 3 is a schematic structural representation of one structural embodiment of the system of the present invention.
Figure 5:
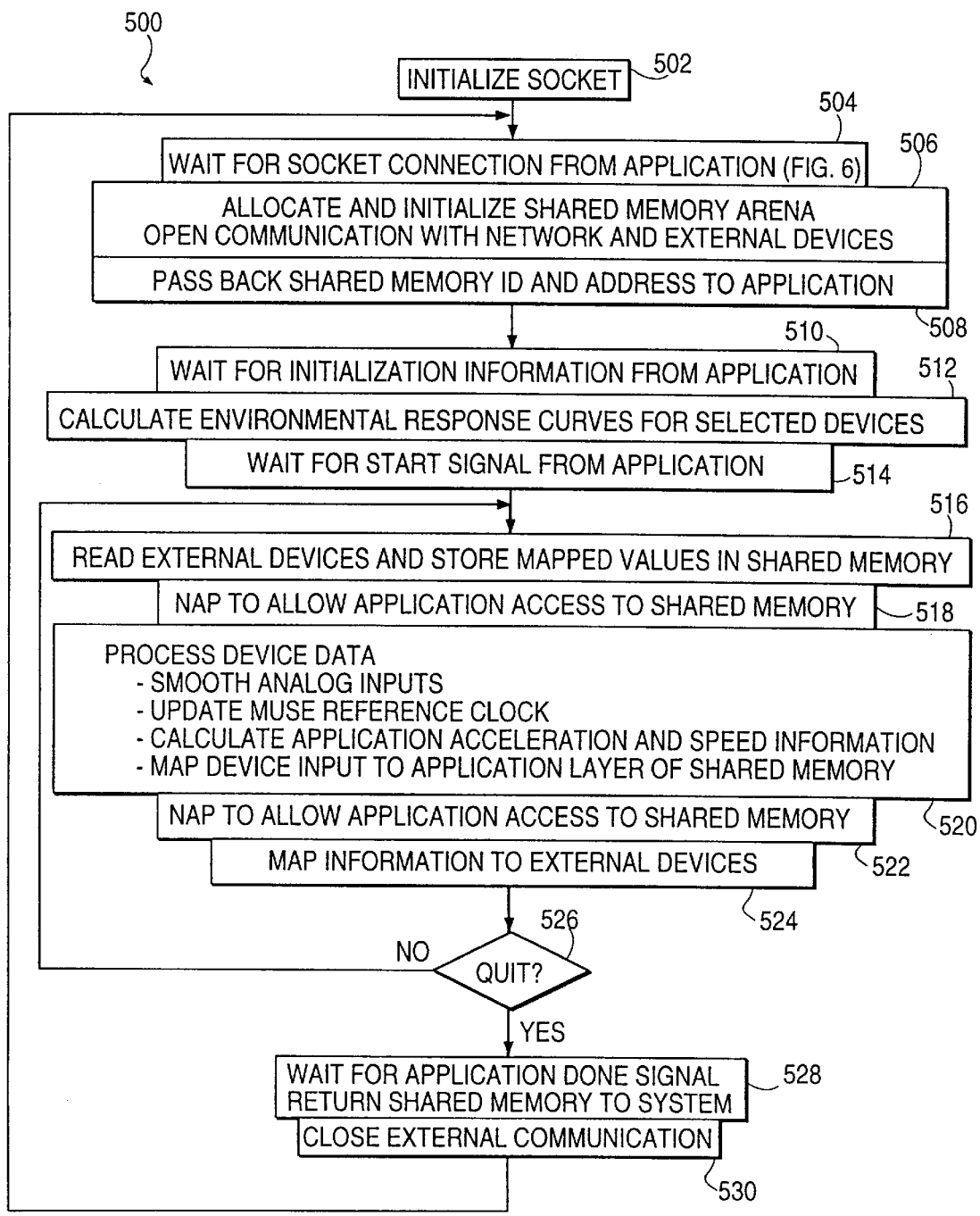
FIG. 5 is a flow chart illustrating a program for managing the timed access to shared memory by the MUSE system and the application program.

FIG. 3 is a hardware diagram illustrating how the MUSE system interfaces with hardware according to the teachings of the present application. Typically, according to the teachings of the present application, the MUSE Deamon algorithm 500 which performs the input and output device handler functions 14, 22 of FIG. 1 and which is illustrated and described in further detail in FIG. 5 is executed by a device processor 310 whose primary function is to provide MUSE Deamon functionality, which translates the input and output device specific commands input from and output to the various specific input and output devices selected for use in the MUSE system of the present application, and translates these commands to device independent functional triggers which are provided to the shared memory 200 as described hereinabove. The shared memory receives these device independent functional triggers and temporarily stores them as described in further detail in FIG. 2, and asynchronously provides these device independent functionality triggers to the MUSE shell 600 which converts the device independent functionality triggers into device independent generic functional commands which are then provided to the application program, model or data 18.

In order to facilitate realtime operation in the MUSE system of the present application, in the preferred embodiment, the application program 18 and MUSE shell 600 are executed by an application processor generally indicated as 330 which is controlled by the MUSE shell and application program. The application processor 330 under control of the MUSE shell 600 asynchronously recovers data from the shared memory 200 in the manner described above. The MUSE shell, in order to perform the functions of the MUSE system, accesses a MUSE sub-routine library 336 which, includes the sub-routines of FIGS. 7–13 of the instant application. Similarly, the modules disclosed in FIGS. 14–19 of the instant application are portions of the application program, model or data 18 of this figure.

As explained with reference to FIGS. 5 and 6, a socket connection 380 between the MUSE Deamon 500 and MUSE shell 600 algorithms must be accomplished in order to transfer shared memory IDs between these two programs so that the same areas in the shared memory will be asynchronously accessed for the same purposes by the MUSE Deamon algorithm 500 and MUSE shell 600. Accordingly, the socket connection 380 is provided between the MUSE Deamon algorithm 500 and the MUSE shell 600 (and/or application), which socket is independent of the shared memory 200. The Muse Deamon 500, shared memory 200, and portions of the application processor 330 other than the application 18, collectively process a synthetic environment data accessing program present therein.

The application processor 330 further, in the preferred embodiment, executes display control functionality 338 to generate a desired video display. This display control functionality produces a desired video image which is provided to a video processor 340 which is an integral part of the application processor 330 in the preferred embodiment of the present invention. Depending upon the type of video output selected by the MUSE system of the present application, the video processor 340 will select a video monitor 342, a stereo display device 344, or any other desired video display. Note that substantially all input and output devices are interfaced with device specific commands which are converted by the MUSE deamon program 500 to/from device independent functionality triggers which are stored in shared memory 200 and are converted by the MUSE shell 600 into device independent generic functional commands for communication with the application program 18. However, in order to enhance system speed, the display functionality of the MUSE system of the present invention is, in the preferred embodiment, driven directly from the MUSE shell 600 (and/or application) and not passed through the shared memory 200.

The MUSE Deamon program 500 receives a variety of device specific input commands from a number of input devices. For example, a microphone 372 may provide voice signals to a voice recognition processor 370 which, in the preferred embodiment, is a personal computer employing Dragonwriter voice recognition software. The voice recognition processor 370 then provides device specific commands to the MUSE Deamon algorithm 500. A joystick 380 may also be used as an input device to provide two or three-dimensional device specific input commands to the MUSE Deamon algorithm 500 through an analog to digital converter 375. Similarly, a six-dimensional headtracking input device may provide device specific input commands to the MUSE Deamon algorithm 500 through an analog to digital converter 376. Any other devices 378 may also provide device specific input commands to the MUSE Deamon algorithm. If any input device provides an analog value, an analog to digital converter 374–376 must convert the analog value into a digital value for processing as a device specific command by the MUSE Deamon algorithm.

In the preferred embodiment, all of the input devices are periodically polled under operation of the MUSE Deamon algorithm 500. Such a polling results in the transmission of data to the MUSE Deamon algorithm, through an RS 232 port, network port, or any other suitable communication channel.

The MUSE Deamon algorithm 500 of the present application further accesses the device independent functionality triggers stored in the shared memory 200 and developed by the MUSE shell 600 from device independent functional commands. The MUSE Deamon algorithm 500 converts these device independent functionality triggers into device specific commands to be provided to various MUSE output devices. In a preferred embodiment, a force feedback device 352 may be a three-dimensional force feedback device for providing force feedback to the user under control of a device controller 350 which, in the preferred embodiment, is normally driven by an independent processor. In the preferred embodiment, device processor 310 also receives device independent functionality triggers from the shared memory and converts them into device specific commands which are provided to a speech synthesis processor 354 which, in the preferred embodiment, is a processor employing a suitable commercial speech synthesis program for supplying voice to a speaker 356. Similarly, a sound processor 358 receives device specific commands produced by the MUSE Deamon program from device independent functionality triggers, which device specific commands represent audio information to be generated or displayed by a speaker 360.

Such audio information in the preferred embodiment, is composed of two basic types of information. A first type includes discrete sounds such as the audible ticking of the MUSE clock, an audible sound representative of MUSE tethering, or the audible sound of a collision with an object within the synthetic environment are all sounds of discrete length which are accumulated in a sound queue and generated for a fixed duration. In contrast, there are a number of mapped sounds which are continuously generated and modified under control of the MUSE system of the present invention. Examples of such mapped sounds include the sound of the craft as it moves about the synthetic environment and any desired data sonification.

Such data sonification, for example, might be the mapping of a critical temperature within an application model or data to an audible sound which varies in frequency or intensity with variation of temperature, to thereby supply the user of the MUSE system of the present application with this information on a user input channel which is parallel to the visual user input channels providing the visual display to the user. In other words, by mapping such data sonification to the sound processor 358 for output by the speaker 360, the amount of information to be appreciated by the user, substantially increases through use of the subcognitive processing of the user's mind as previously described.

It should be understood that any inputs and outputs may be selected for use with the MUSE system of the present invention. Such inputs and outputs interface with the MUSE system of the present invention by receiving or providing device specific commands to the MUSE Deamon program 500 executed by the input device processor 310. This MUSE Deamon program then converts the device specific commands from input devices into device independent functionality triggers which are stored in shared memory 200 and then accessed by the MUSE shell 600 for conversion into device independent generic functional commands which are provided the application program 18. The MUSE shell 600 similarly receives device independent generic functional output commands from the application program 18 and produces device independent functionality triggers which are stored in shared memory to be asynchronously accessed by the MUSE Deamon algorithm 500 for conversion into device specific output commands.

The MUSE Craft

Figure 4A:
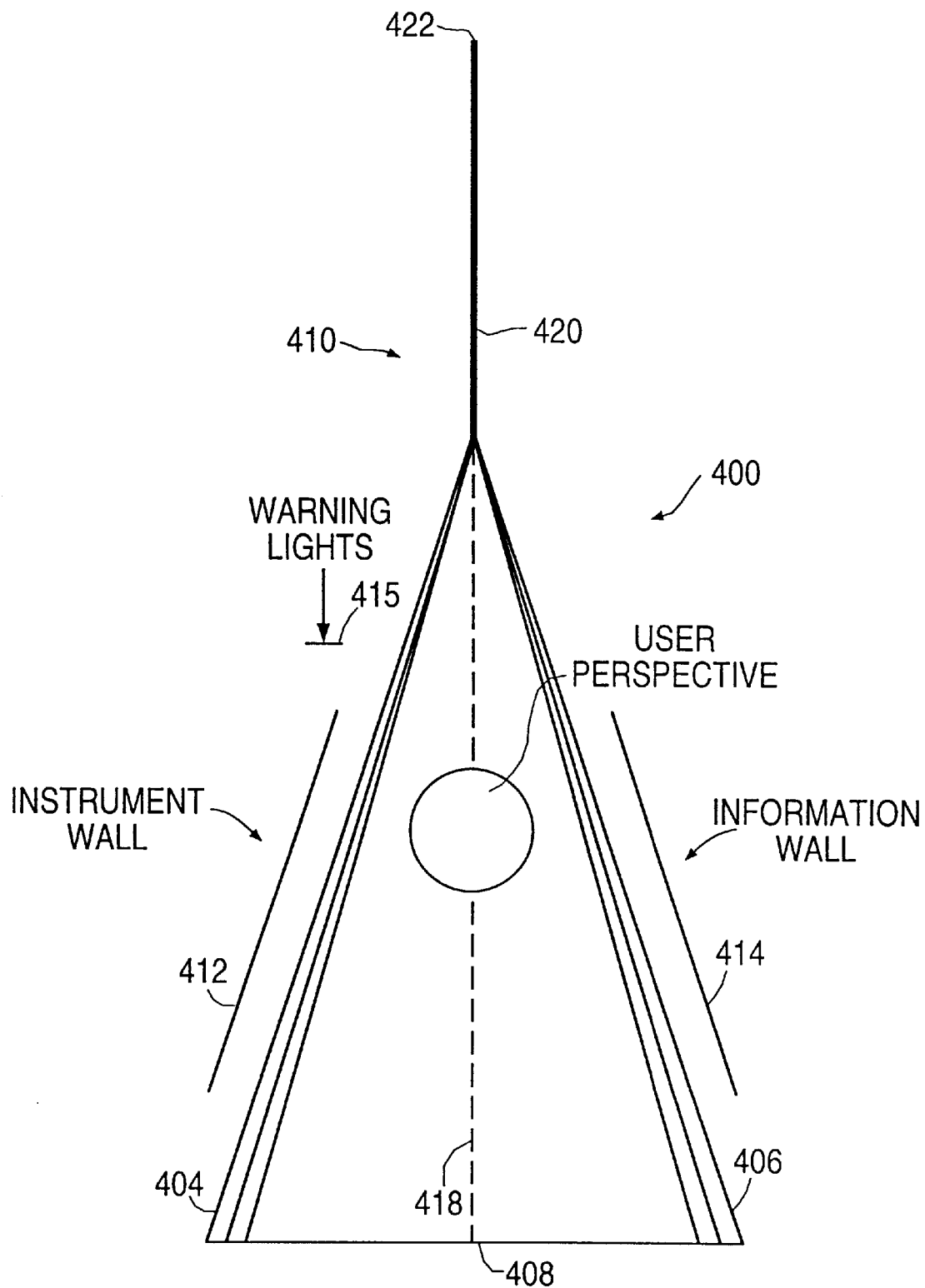
FIG. 4(A) is a schematic illustration of the appearance and relative user placement of the craft utilized in the system of the present application.

FIG. 4(A) is an illustration of the MUSE craft (generally indicated as 400) which provides important visual clues according to the teachings of the present invention. As previously mentioned, the craft 400 is designed to surround a user viewpoint 402 and provide a common referential point within a synthetic environment as well as important motion parallax clues to aid the user in determining distance and direction to objects within the environment, as well as aiding the user in determining the relative angle of the user perspective with respect to the craft outline. Changes in user perspective can accordingly be easily ascertained. The craft 400 surrounds the user viewpoint 402 and, other than referential lines and information, is generally transparent so that the user may more easily perceive the synthetic environment without interference from the craft. The MUSE craft may be thought of as an extended mobile office from which the user enters, moves, and interacts with the synthetic environment. The craft is drawn in the synthetic environment as if wrapped around the lower chest level of the user. An important feature of the craft 400 is the effect of a set of left converging referential lines 404 and right converging referential lines 406 which collectively converge on a track and tether reference line 420 which extends along a craft access 418 defined by the user viewpoint 402 and the identifiable front, generally indicated as 410, of the craft.

It is important for the craft 400 according to the teachings of the present application, to have the identifiable craft front 410 in FIG. 4(A), which craft front 410 indicates to the user the expected direction of travel of the craft. This craft front 410 further aids the user in determining both motion parallax and the relative angle of the user perspective with respect to craft alignment thereby providing the user with an important perspective reference. The left converging referential lines 404 comprise, in the preferred embodiment, a plurality of near parallel but converging alternating black and white lines. When the user perspective extends transversely to the craft axis 418, the user may appreciate the relative angle with respect to the craft axis 418 by the relative spacing within the appropriate converging left or right referential lines 404, 406. The preferred embodiment utilizes alternating black and white lines within the converging referential lines 404, 406, so that these lines will be easily ascertainable independent of background color within the synthetic environment. In other words, the black lines of the alternating black and white lines will be easily ascertainable against a light background while the white lines of the alternating black and white lines will easily be ascertainable against a dark background.

A track and tether reference line 420 is provided to allow the viewer to visually appreciate the direction of movement of the craft and further facilitate the grasping of objects and tethering to objects in the synthetic environment at a tether extremity 422 of the track and tether reference line 420. For example, if the user of the MUSE system wishes to grasp and manipulate an object within the synthetic environment, the user will pilot the craft 400 so that the tether extremity 422 of the track and tether reference line 420 is juxtaposed to the object. A "grasp" device independent generic functional command will then be utilized to attach the tether extremity 422 of the craft to the object so that the object may then be manipulated within the synthetic environment. Such a "grasp" device independent generic functional command can be introduced by any input device 12 but will be typically introduced via a speech recognition, vocal command responsive specific input device which is mapped to the generic functional command "grasp". In the preferred embodiment, the track and tether reference line 420 is also formed of adjacent black and white lines so that the track and tether reference line 420 will be ascertainable despite the background color.

The MUSE craft 400 of the present invention may additionally comprise a craft rear reference line 408 which defines the rear extremity of the craft. The user viewpoint 402, in the preferred embodiment of the MUSE craft 400 of FIG. 4(A), is positioned somewhat above a plane defined by the left and right converging referential lines 404, 406 so that these lines will not obscure features within the synthetic environment viewed transverse to the craft access 418 but will still be visible to the user in the bottom portion of the display.

The craft 400 utilized according to the teachings of the present invention desirably includes a left wall 412 and right wall 414 which, while transparent, may be used to display desired instrumentation and information. In the preferred embodiment of the present application, the instrument wall 412 includes a set of positional displays illustrating the craft's relative position within the synthetic environment, a craft velocity indicator indicating the craft's relative velocity along the craft axis 418, and a time base display to show the relative mapping used between the time base within the application program, model or data 18, and the frame rate of the MUSE system. The instrument wall may optionally also display the scaling factor for the MUSE craft 400 showing the relative size of the MUSE craft with respect to the scale of the model or data accessed by the MUSE system. The left or instrument wall 412 may also optionally display the status of the headlamp which is optionally used according to the teachings of the MUSE system of the present application to illuminate objects within the synthetic environment from the craft front 410 of the craft. The instrument wall 412 may then display a graphical representation of headlight intensity so as to allow the user to monitor headlight intensity.

The instruments provided on the left, instrument wall 412 of the craft may be added by the application program as desired. The user may then selectively toggle the additional instruments provided by the application program as desired. In such a case, an instrument sub-routine is provided by the application program and accessed by the MUSE shell at appropriate times to allow the application to draw the particular instrument.

The MUSE craft 400 further includes a right wall which is also transparent in the preferred embodiment. Desirably, the right wall may be used to display desired information. For example, in the video drawing of the present application, the portion of this drawing which illustrates the navigation of the brain model was produced using actual computer aided tomographic data of a human brain. In this example, the actual computer aided tomographic data may be seen displayed on the right wall of the craft as illustrated in this example. Similarly, any suitable data may be displayed on this wall and thus the user may fully appreciate the relationship of the synthetic environment to the original data used to create it. Alternatively, any other desired data may be displayed on the information wall 414.

The craft 400 of the preferred embodiment may also include a warning light display 416 which, in the preferred embodiment is also displayed on a transparent background so that the user is advised of some form of transformation of the synthetic environment by the MUSE system or the application program. For example, the warning light display 416 may warn the user about the presence of time or distance scaling. A warning display is, in the preferred embodiment, a banded circular display with a word of text that describes the spatial transformation. A warning display pulses in time from bright to dark in order to attract a minimal amount of attention to remind the user that something is different from normal about the environment. The warning display may be turned on and off by the user of the MUSE system, the MUSE system itself, or the application program.

Figure 4B:
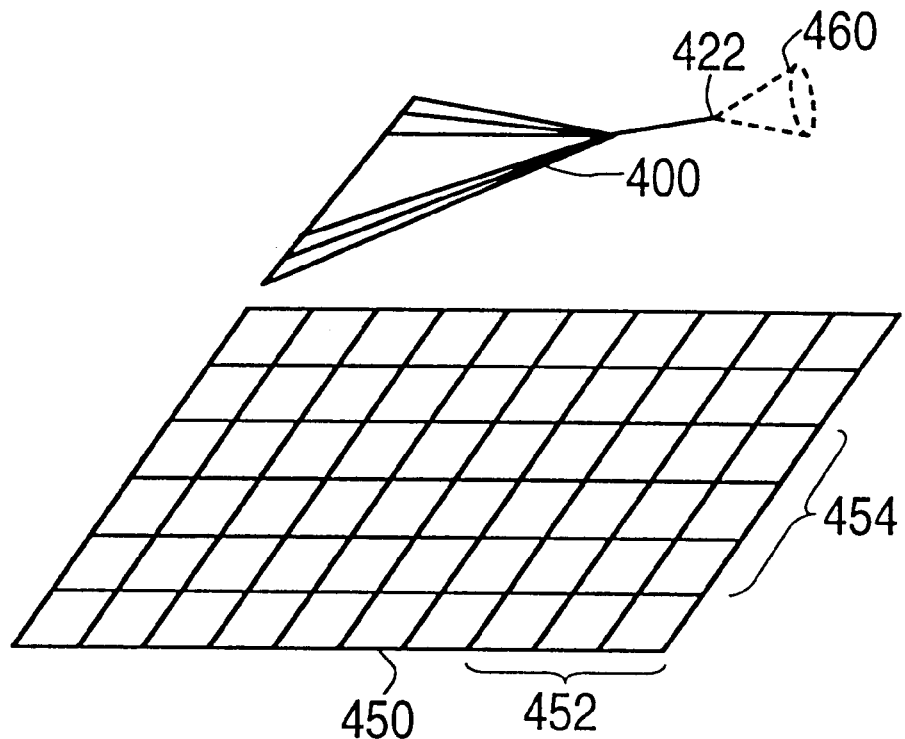
FIG. 4(B) is a schematic illustration of an exemplary floor utilized to provide a gravity cue in one embodiment of the present invention.

Although MUSE is capable of handling a 6° of freedom cockpit which moves the user through space, most systems will not be able to afford the processing support required for real time use of such hardware. Therefore, an alternative method of providing a gravity cue must be constructed. This is done in the system of the present application, as illustrated in FIG. 4(B) by providing a floor 450 which is constructed of a plurality of horizontal lines extending in the X direction 452 and a plurality of horizontal lines extending in the Y direction 454. This grid of horizontal lines is constructed in contrasting colors and provides an indication of angular shift of perspective as the user's perspective of up, down, left, right, forward and backward changes. The floor grid enables the user to perceive the motion of the craft through the synthetic environment with respect to a reference horizon even where the concepts of up and down are not readily ascertainable from the data displayed. The user is selectively able to toggle the floor grid on or off as desired through use of the MUSE event handler algorithm of FIG. 12 as will be later described. In addition, this grid may be used to represent (e.g., plot) additional data.

The MUSE Deamon Algorithm

FIG. 5 illustrates the MUSE deamon algorithm (generally indicated as 500) which generally corresponds to the input device handlers 14 and output device handlers 22 of FIG. 1 of the instant application. The MUSE deamon algorithm 500 is a background resident program which performs, as demanded, supplying inputs from the input section including input devices to shared memory 200 as device independent functionality triggers. The MUSE deamon algorithm 500 begins by initializing a socket in step 502 to secure connection to the application program, model or data 18. In step 504, the MUSE deamon algorithm 500 awaits a socket connection from the MUSE application 18 as performed by step 604 of FIG. 6 as will be later described. Once connection with the application program 18 is made, the MUSE deamon algorithm 500 allocates and initializes the shared memory 200 and opens communication with all network and external devices in step 506. In step 508, the MUSE deamon algorithm passes back shared memory I.D. and address information, also via step 604 of FIG. 6. The MUSE deamon algorithm then waits for initialization information from the application program 18 at step 510 which initialization information is received via step 610 of FIG. 6. In step 12, the MUSE deamon algorithm 500 calculates environmental response curves for selected devices within the network and external devices corresponding to the input section 12 and output section 24 of FIG. 1. In essence, step 512 maps the input and output devices to device independent functionality triggers representative of the desired responses of the MUSE system to the selected input and output devices.

Once the desired input/output devices are mapped to environmental responses within the MUSE system, the MUSE deamon algorithm waits at step 514 for a start signal from the MUSE application 18.

Upon receipt of an application start signal, the MUSE deamon algorithm 500 reads external devices and stores mapped values (device independent functionality) into shared memory 20 at step 516. The MUSE deamon algorithm 500 then naps at step 518 to allow application 18 access to shared memory. Subsequently, at step 520, the MUSE deamon algorithm 500 processes device data to smooth analog inputs (when necessary), updates the MUSE reference clock, calculates application acceleration and speed information from the device independent functionality triggers. The MUSE deamon algorithm 500 further maps device inputs to their associated device independent functionality triggers which are then stored in shared memory 200 during step 520. The MUSE deamon algorithm 500 then naps at step 522 to allow application access to shared memory 200.

At step 524, the MUSE deamon algorithm 500 accesses shared memory 200 to withdraw device independent output data from the shared memory and provides this data to external devices. At step 526, the MUSE system determines whether the processing of the application program, model or data 18 by the MUSE system of the present application has been completed. Unless it is time to quit as determined by step 526, steps 516, 518, 520, 522 and 524 are iteratively repeated throughout the processing of application data by the MUSE system.

The determination of whether to quit the MUSE system is done on the basis of an application done signal. This application done signal is a device independent functional command which may be mapped for MUSE or application program event responsive functionality or from any desired input(e.g. an off button, the command OFF provided by a speech recognition device, etc.). When an application done signal is received, step 526 determines that it is time to quit and thus, in step 528, the shared memory is returned to the system. In step 530, the MUSE deamon algorithm 500 closes external communications with all network and external devices to complete its operation and awaits another socket connection from the MUSE shell.

The MUSE Application Shell Algorithm

Figure 6:
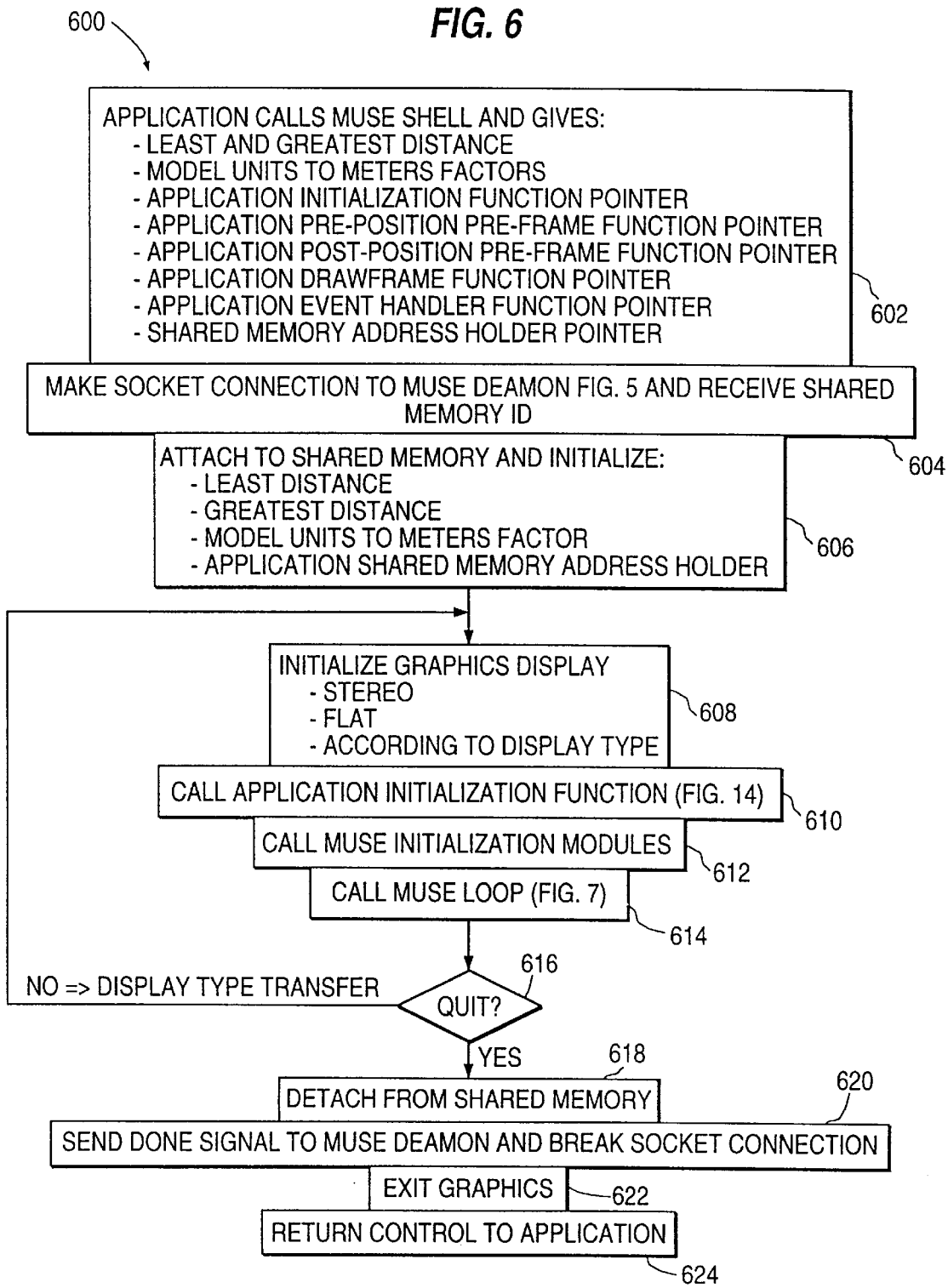
FIG. 6 is a flow chart of the application shell which is used to access MUSE via an application program.

The MUSE application shell algorithm (generally indicated as 600) of FIG. 6 performs the functions of the input and output functional level 16, 20 of FIG. 1, interfacing with an application program, model or data (a MUSE application) 18. At step 602, the MUSE application 18 calls the MUSE shell 600 of FIG. 6 and initializes the shell by providing important application generated information which must be supplied to the MUSE shell 600 to initialize the MUSE system. In step 602, the Muse application 18 provides the MUSE shell 600 with the least and greatest distances which correspond to the distances used to define the graphic clipping plane as described in greater detail in FIG. 10 of the instant application. The least and greatest distances are used to define the points of closest and farthest resolution in the displayed image which, by the relationship between these distances, also defines the level of detail in view of the fixed bit length of the informational words used to define a video frame. At step 602, the MUSE application 18 further provides the MUSE shell 600 with model units to meters factors which define the scale of the model, an application initialization function function pointer which provides the initial address which provides the initial address of the application initialization module of FIG. 15, an application pre-position pre-frame function pointer which tells the MUSE shell 600 the initial address of an application pre-position pre-frame module 1650 which provides the MUSE system with time frame information, and an application post-position pre-frame function pointer which provides the MUSE shell 600 with the initial address of an application post-position pre-frame module 1750 which provides the MUSE system with a time in which some application controlled function is to be performed. At step 602, the MUSE application 18 further provides the MUSE shell 600 with an application draw frame function pointer which provides the MUSE shell 600 with the initial address of an application draw frame module 1800 of FIG. 18, an application event handler function pointer which tells the MUSE shell the initial address of the application event handler module 1900 of FIG. 19 which provides the MUSE system with the points at which specific application functionality will be altered, and a shared memory address holder pointer which locates an appropriate address for access of the shared memory 200.

In step 604, the MUSE application shell 600 makes a socket connection to the MUSE deamon algorithm 500 and receives the shared memory I.D. from this algorithm in a manner that will be familiar to UNIX programmers. At step 606 the MUSE application shell 600 attaches to shared memory 200 and initializes the functional pointers, device pointers, and state information stored in shared memory, providing the shared memory with the least distance, greatest distance, model units to meters factors, and application shared memory address holder information, much of which is supplied the MUSE shell 600 by the MUSE application 18 in step 602 through functional calls by the application program 18.

The MUSE application shell 600 then initializes the graphics display depending upon the parameters of the individual graphics display, including necessary initialization parameters for any of the stereoscopic displays, flat displays and the like which are to be used as would occur to one of ordinary skill in the art.

Figure 15:
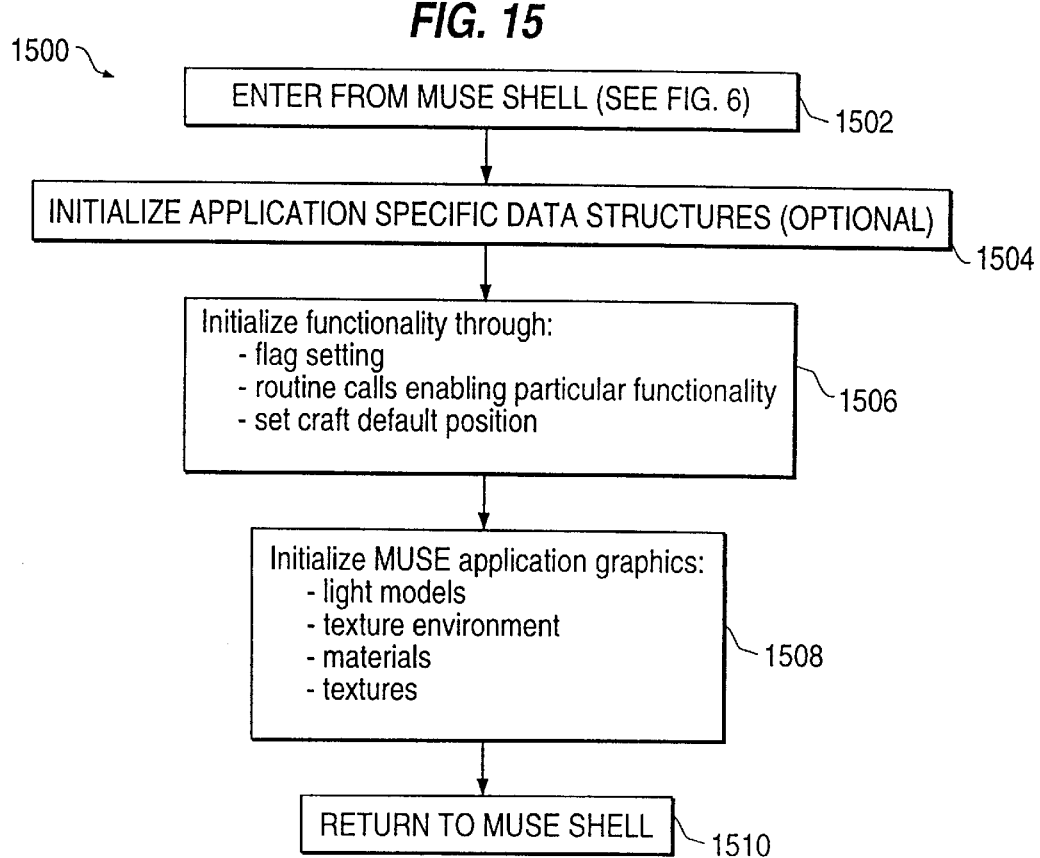
FIG. 15 is a flow chart illustrating the application initialization module provided by a MUSE application 18 in the system of the present application.

At step 610, the MUSE application shell 600 calls an application initialization function from the application program, model or data 18 as illustrated in FIG. 15. At step 612, the MUSE application shell 600 causes MUSE initialization modules to initialize necessary system variables including setting local memory pointers to establish access points to shared memory as would be understood by one of ordinary skill in the art. At step 614, the MUSE application shell 600 calls a MUSE loop (generally indicated as 700) of FIG. 7. The MUSE loop 700, which will be later described, generates the MUSE craft 400, assembles video frame information, and handles events within the MUSE system. This MUSE loop 700 operates within the MUSE application shell 600 and performs the primary functionality of the input and output functional levels 16–20 of FIG. 1.

At step 616, the MUSE application shell 600 determines whether the user has completed work within the MUSE environment. This is performed by accessing a state location in shared memory 200 to determine if a device independent completion command has been generated by an input, or by MUSE system or application program 18 functionality. If the MUSE system continues operation, steps 608–614 are iteratively performed.

If the MUSE application shell 600 determines that the user has completed usage of the MUSE system and the application program, model or data utilized therein, then at step 16, the MUSE application shell 600 will direct the program to a series of shutdown steps including, at step 618, detachment from shared memory and returning of shared memory to the system. At steps 620, a completion signal is provided to MUSE deamon algorithm 500 and the socket connection between the MUSE deamon algorithm 500 and the MUSE application shell algorithm 600 is disconnected. At step 622, the communication with graphics processing equipment is exited. At this point, it should be noted that, while the input and output functional levels and application program may be processed by the same processor as the video display processing, video display processing is desirably accomplished with an additional processor to take the substantial processing load of the video graphics away from the MUSE functional level and application program processor, thereby simplifying the processing of the application program 18 by the MUSE system in substantial realtime. In step 624, the MUSE system passes control back to the application program model or data 18 which, if desired, will exit the application.

The MUSE Loop Algorithm

Figure 7:
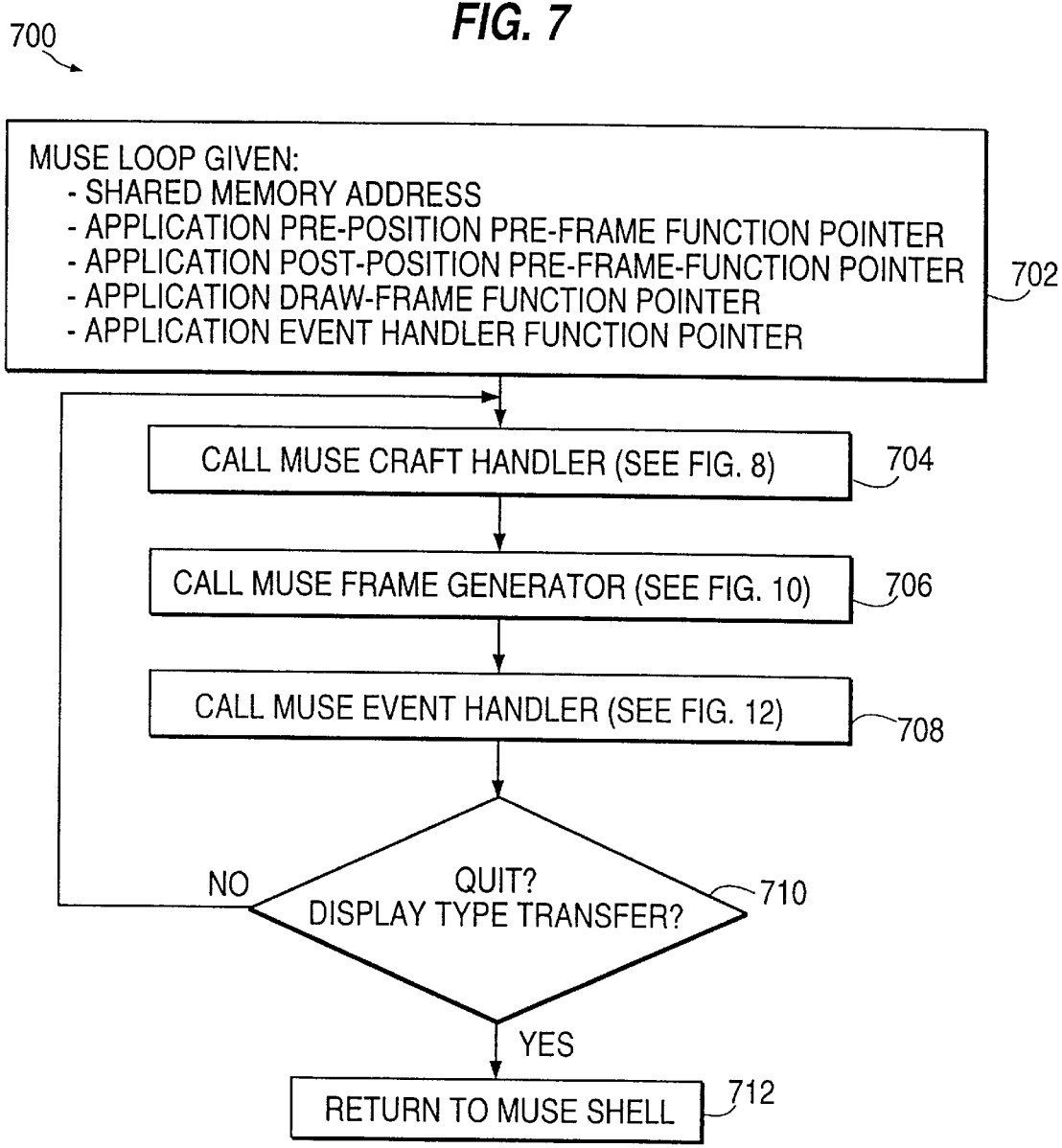
FIG. 7 is a flow chart of the MUSE loop utilized in FIG. 6.

The MUSE loop 700 of FIG. 7 constitutes a substantial portion of the MUSE system of the present application. In step 702, the MUSE loop is initialized by having the MUSE application shell 600 provide the MUSE loop with the shared memory address, application pre-position pre-frame function pointer, application post-position pre-frame function pointer, application draw-frame function pointer and application event handler function pointer. In step 704, the MUSE loop calls a MUSE craft handler algorithm (generally indicated as 800) as described in greater detail with respect to FIG. 8. The MUSE craft handler algorithm 800 updates the craft position and attitude within the synthetic environment. Step 706 accesses the MUSE frame generator (generally indicated as 1000) which is described in greater detail with reference to FIG. 10. The MUSE frame generator 1000 generates the video image including both the perspective view of the synthetic environment and of the craft 400 including the craft walls 412, 414, referential lines 404, 406, warning light display 416, and track and tether reference line 420. The MUSE frame generator 1000 assembles these perspective images and displays them on the desired display.

Figure 12:
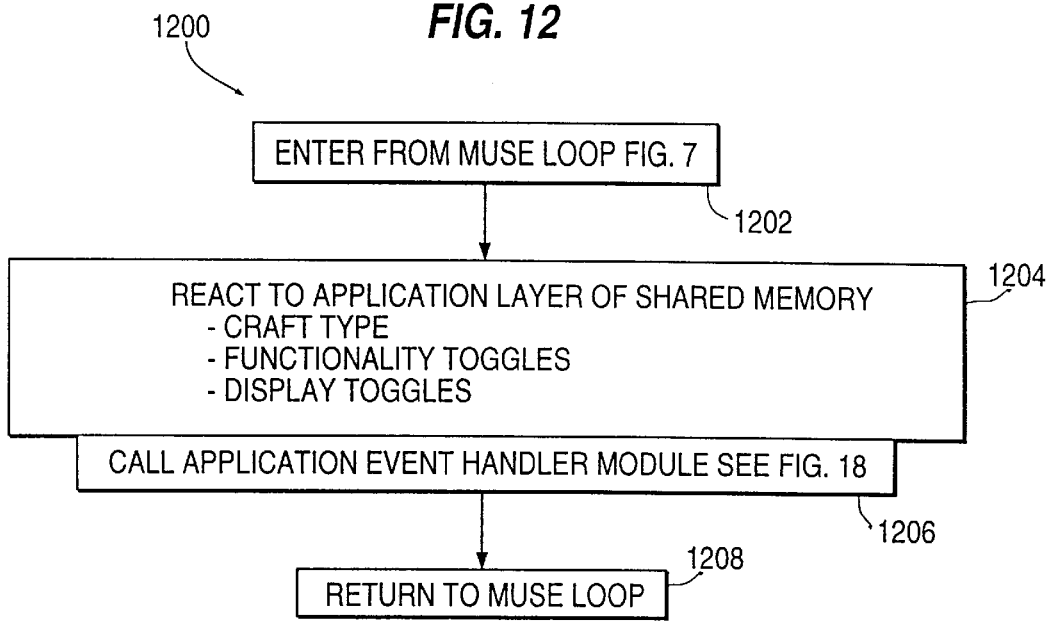
FIG. 12 is a flow chart of the MUSE event handler 808 accessed by step 708 of FIG. 7 which monitors application events.

The MUSE loop algorithm 700 next calls the MUSE event handler (generally indicated as 1200) of FIG. 12 in step 708. The MUSE event handler 1200 monitors various toggles and pointers stored within the data level 210 of the physically shared memory 200 and controls the application event handler module (generally indicated as 1900) of FIG. 19 which is a part of the application program, model or data 18 according to the teachings of the present application. The MUSE event handler 1200 actuates MUSE specific functionality in response to event requests.

Figure 19:
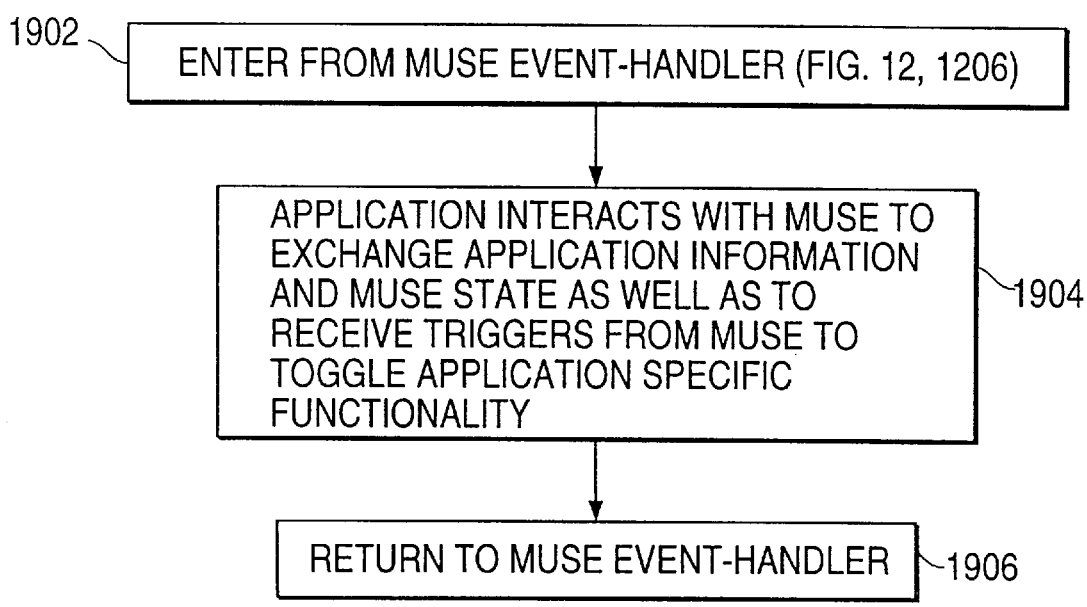
FIG. 19 is a flow chart illustrating the application eventhandler module accessed at step 1206 of FIG. 12 and provided by a MUSE application 18 in the system of the present application.

The MUSE event handler 1200 also accesses the application event handler module 1900 of FIG. 19 to cause the application event handler module 1900 to actuate application specific functionality. The MUSE event handler 1200 and the application event handler module 1900 further, by setting toggles and pointers within the physically shared memory 200, pass event information between the application program 18 and the MUSE system. Examples of such functionality toggles include a record session enable toggle which, when on, enables the virtual video functionality of the present application, object identifying and object tethering toggles, a headlight toggle, a floor grid on/off toggle, and instrument toggles. The event handler further reacts to a number of other toggles which enable the locking of the craft to an object, object transformation, the turning on or off of sound generation or recognition, enabling and disabling the graphical clipping planes, stopping and resuming time, the selection of display type, the setting of N-dimensional markers which each include a marker identifier and location, and the enablement of MUSE or application provided transformation functionality and correlation filters. Toggles are further provided to enable the grasping and movement of objects within the synthetic environment.

While all of these above-mentioned functions may be performed by the MUSE event handler algorithm of FIG. 12, they may also be performed by the application event handler module 1900 provided by the MUSE application 18.

In step 710, the MUSE loop 700 determines whether a particular display sequence has been completed. If a display sequence has been completed so that a new display type such as a new application program, model or data 18 is accessed, step 710 determines that display of this information is completed and thus, at step 712, the MUSE loop algorithm 700 returns to the MUSE application shell 600 to facilitate reinitialization of MUSE, selection of a new application program, and corresponding graphical display. Alternatively, if the MUSE system is to transfer images to a different display, the query at step 710 will return program processing to the MUSE shell 600 at step 712. In essence, the MUSE loop 700 controls the sequencing of a selected application, stepping the application through its sequence in a time ordered fashion unless there is a return to the MUSE shell 600.

The MUSE Craft Handler

Figure 8:
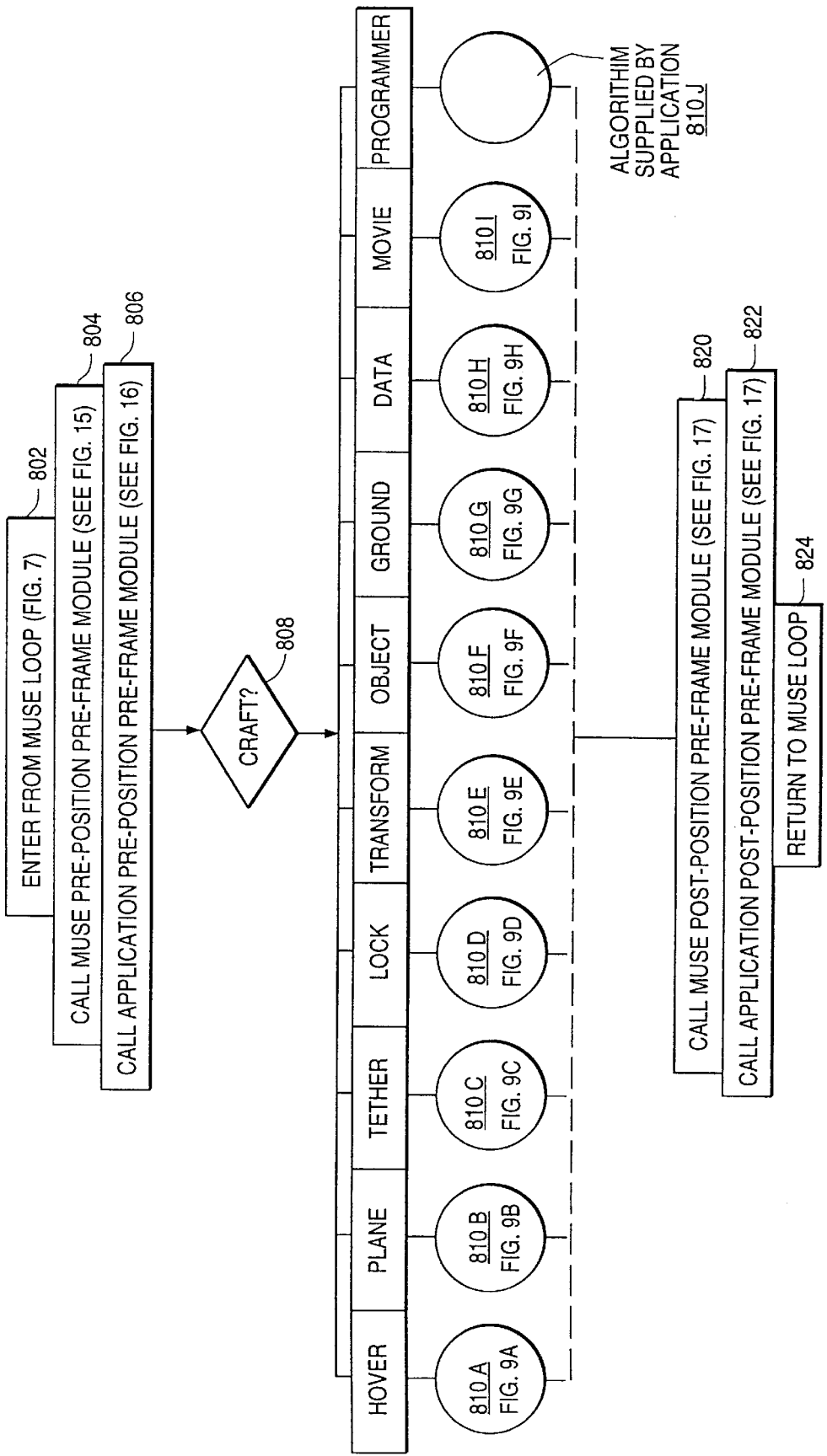
FIG. 8 is a flow chart illustrating the operation of the MUSE craft handler algorithm accessed at step 704 of FIG. 7 and illustrating the various craft modes which may be selected.

Referring to FIG. 8, the MUSE craft handling algorithm 800 of the instant application will now be described. At step 802, the MUSE craft handler algorithm is entered from the MUSE loop 700 of FIG. 7. In step 804, the MUSE pre-position pre-frame module (generally indicated as 1600) is accessed as will be later explained with regard to FIG. 16. However, the MUSE pre-position pre-frame module 1600 determines the state of the craft handler 800 on the basis of any event which effects the position of the craft. For example, if the MUSE tethercraft is to be used under control of the algorithm 810C of FIG. 9C, and the tethercraft is to be tethered to a MUSE generated object, then the MUSE pre-position pre-frame module 1600 tells the MUSE system to pick up the tethered object matrix.

In step 806, the application pre-position pre-frame module 1650 is called. The MUSE pre-position pre-frame module 1600 accessed in FIG. 804 and the application pre-position pre-frame module 1650 accessed in step 806 differ only in the source of the data that they would access. Accordingly FIG. 16 further illustrates the application pre-position pre-frame module 1650. Predictably, the MUSE pre-position pre-frame module 1600 accesses MUSE data while the application pre-position pre-frame module 1650 accesses application data.

In step 808 of the MUSE craft handler algorithm 800, the system determines if a craft is selected and which craft type is selected. If no craft is selected, then the MUSE craft handler algorithm skips directly to step 810. The MUSE system of the present invention may select one of a variety of craft which differ in the manner in which they travel through the synthetic environment. While each of these craft are graphically illustrated in slightly different fashion, each respective manner of movement is substantially different. For example, the planecraft travels about the synthetic environment with complete freedom in the manner of an aircraft by climbing, diving and turning. The tether craft is tethered to an object within the synthetic environment and travels in synchronism with this object. The ground craft travels across a surface defined within the synthetic environment, staying substantially in contact with the surface while being steerable to the left and right. Accordingly, it is apparent that the various craft selectable in step 808 have different attributes which make them desirable at different times and in different applications for the navigation of the application program, model or data 18.

Each of these particular types of crafts selectable in step 808 are defined by an individual craft algorithm 810A–810J as illustrated in FIGS. 9A–9I or alternatively as supplied by an algorithm within the application program, model or data 18. While the MUSE system provides a variety of craft models, a particular application programmer may find that a different craft model may be desirable for that application program's particular type of data. In such a case, MUSE allows the application programmer to add a craft algorithm in the application program, model or data 18 which may be accessed by the MUSE craft handler algorithm 800 of FIG. 8. Each of the crafts described in FIG. 9(A)–(I) or alternatively, as supplied by an algorithm within the application program 18, are controlled by user handled devices which are mapped through ramping acceleration algorithms.

The calculation of values for the acceleration ramps are determined by two values given to the system by the application. The least distance which is necessary for fine control and a radial distance which encompasses the entire sphere of interest. From these two values, several different acceleration and deceleration ramps are precalculated. The system then watches the input device which is currently mapped to produce the acceleration and deceleration ramps and calculates a velocity depending upon how the user manipulates the device. If the user is exhibiting fine control, the acceleration and deceleration will be adjusted correspondingly. If the user is making gross motions, the acceleration and deceleration is similarly adapted to this operation. Since the system of the present invention utilizes the application frame rate as the time factor, different models will not substantially effect the perceived acceleration and deceleration rates.

The MUSE system may smoothly switch between the crafts specified in FIGS. 9(A)–(I) and by the application program 18. Transfer between craft types is performed smoothly to provide continuity of motion. When a transition between crafts is being performed, system time is temporarily halted to insure smooth transfer of craft type.

Figure 17:
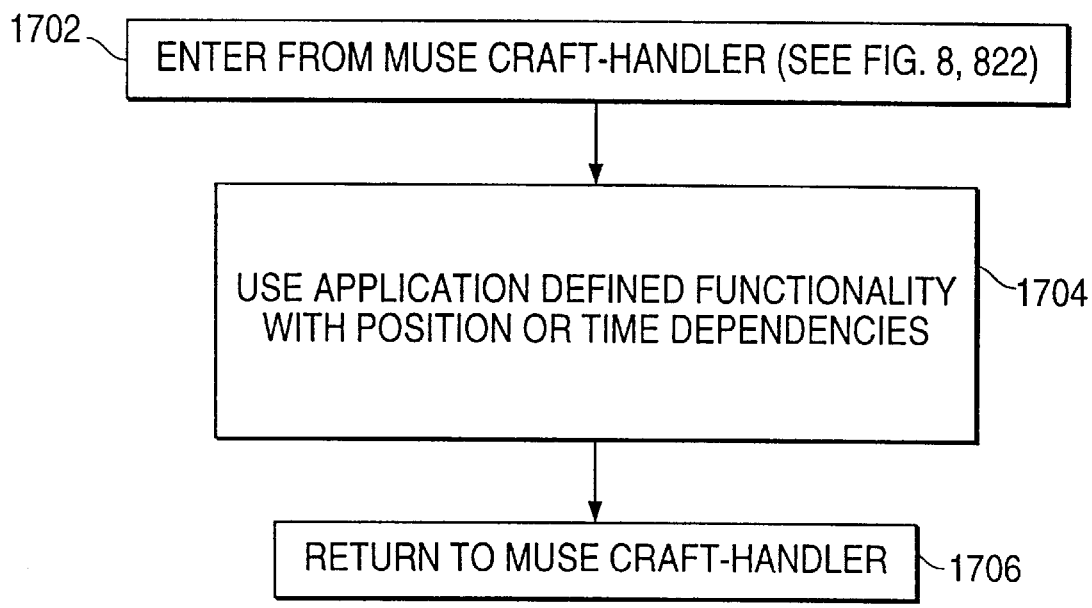
FIG. 17 is a flow chart illustrating the application postposition pre-frame module accessed at step 822 of FIG. 8 and provided by a MUSE application 18 in the system of the present application.

In step 820, the MUSE craft handler algorithm 800 calls the MUSE post-position pre-frame module 1700 of FIG. 17. Subsequently, the MUSE craft handler algorithm 800, at step 820, accesses the application post-position pre-frame module 1750. The MUSE post-position pre-frame module 1700 and application post-position pre-frame module 1750 differ only in the data in which they access. Accordingly, while FIG. 17 represents the application post-position pre-frame module 1700, the MUSE post-position pre-frame module 1750 accessed by step 820 is otherwise equivalent. The purpose of these modules which are provided to the MUSE application 18 according to the teachings of the present application is to access MUSE or application defined functionality with reference to position or time. Thus, when position or time dependent functionality (e.g., "if at a particular location, X, do a particular function such as emit a sound", or "if at a particular time, Y, then do another particular function", respectively) are needed, the associated application or MUSE functionality is accessed. Accordingly, the MUSE system or application tells the MUSE craft handler algorithm 800 to take some action at a point in time or space. At step 824, the MUSE craft handler algorithm of FIG. 8 returns to the MUSE loop algorithm of FIG. 7.

Figure 9A:
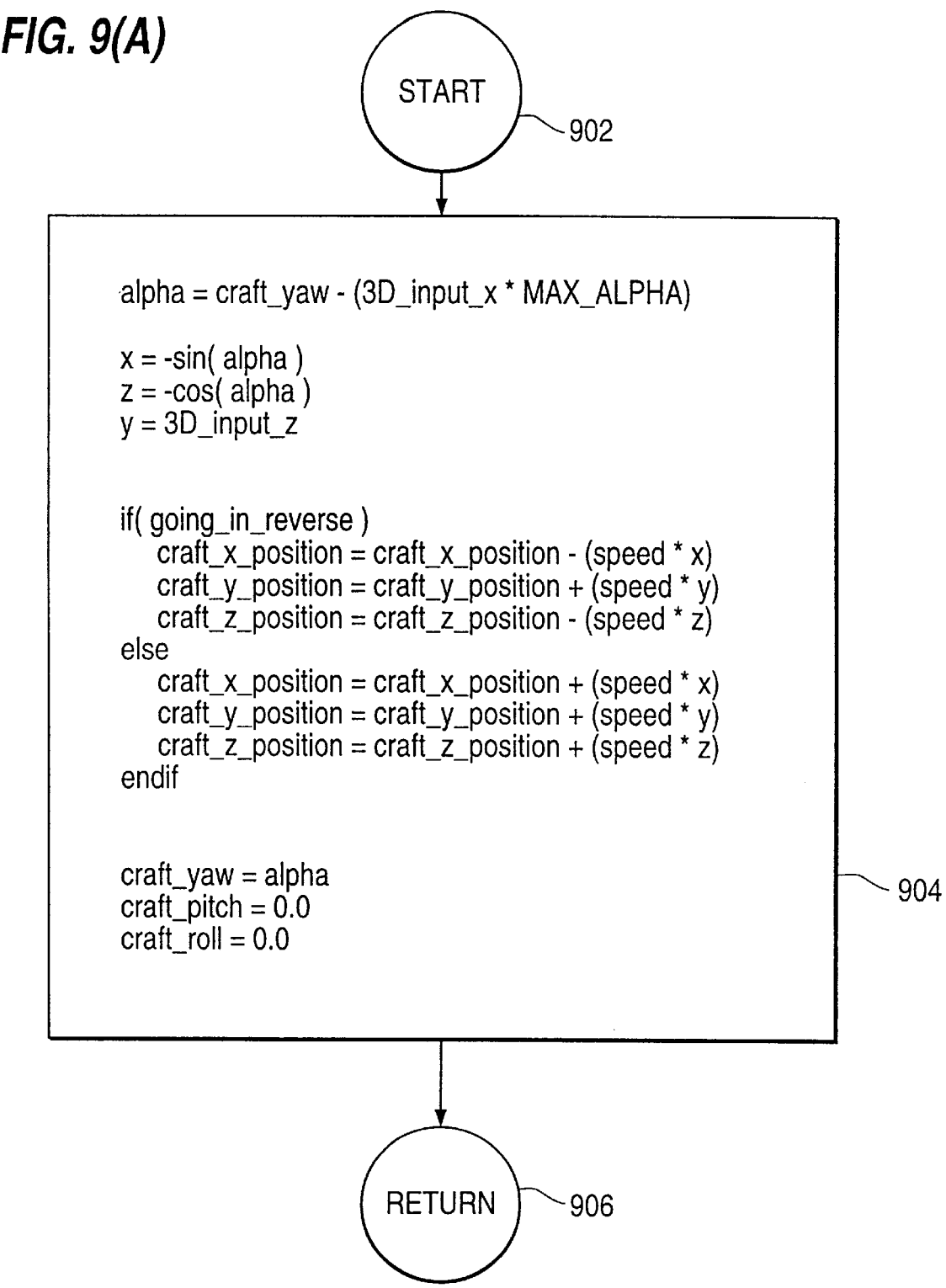
FIG. 9(A) is an illustration of the MUSE hovercraft algorithm.

The craft 400 of FIG. 4(A) lies in a craft plane defined by the plane of the paper in this Figure. The hovercraft of FIG. 4(A) is the default craft which is enabled in the absence of other specific instructions. The hovercraft has the property of always maintaining a level orientation to the floor of the application data or model. In the MUSE hovercraft algorithm 810A of FIG. 9(A), the craft may rotate left or right within the plane, may raise and lower in a direction normal to the plane but while retaining an attitude parallel to the plane, and, of course, can travel along the craft access. The MUSE hovercraft algorithm does not permit the craft to bank while turning or realign into a different plane. In other words, the craft, in accordance with the MUSE hovercraft algorithm of FIG. 9A is always in a plane parallel to its starting plane.

Figure 9B:
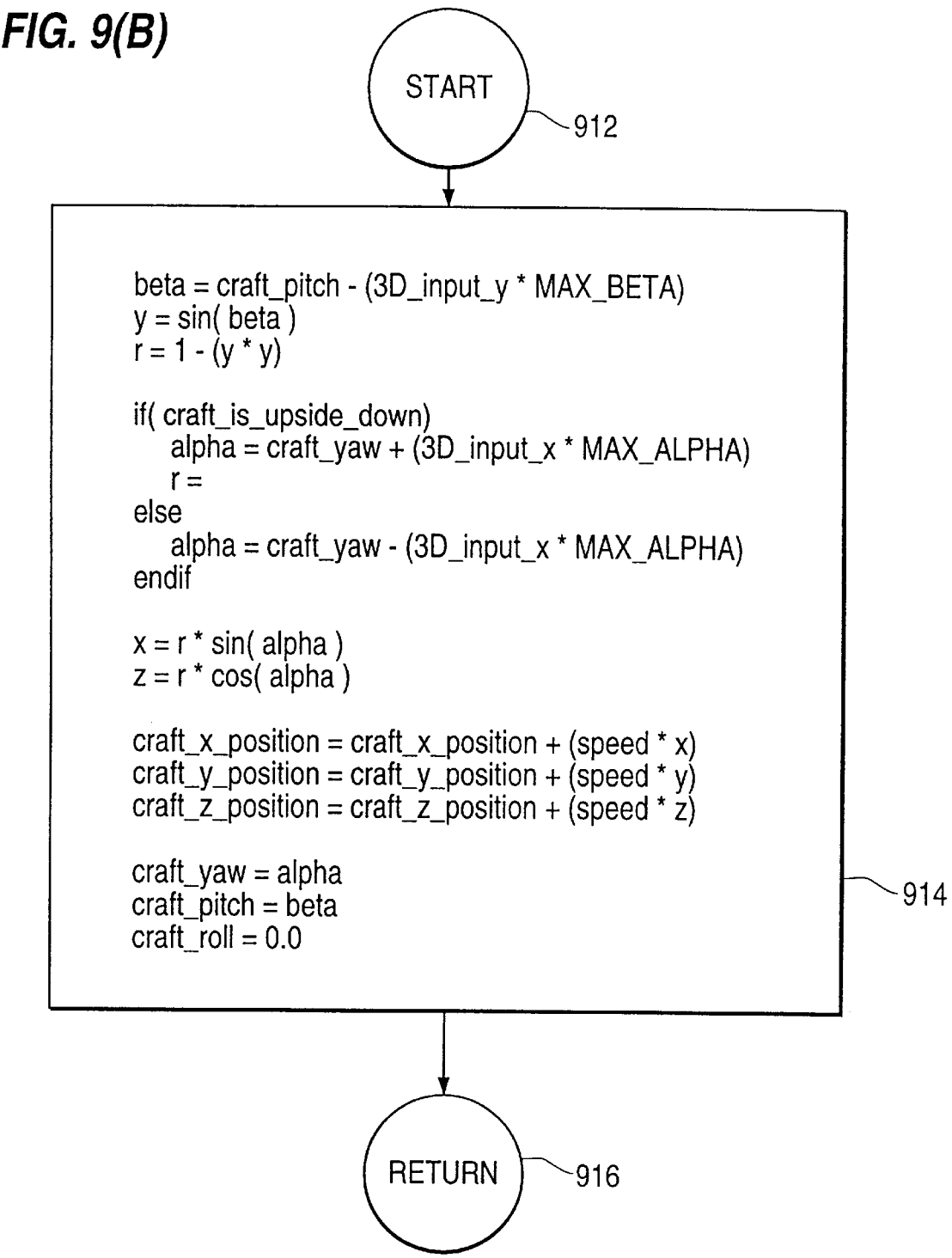
FIG. 9(B) is an illustration of the MUSE planecraft algorithm.

The MUSE planecraft algorithm 810B of FIG. 9(B) allows the craft to turn, climb and dive in a manner similar to an aircraft. The plane craft may not move backwards.

Figure 9C:
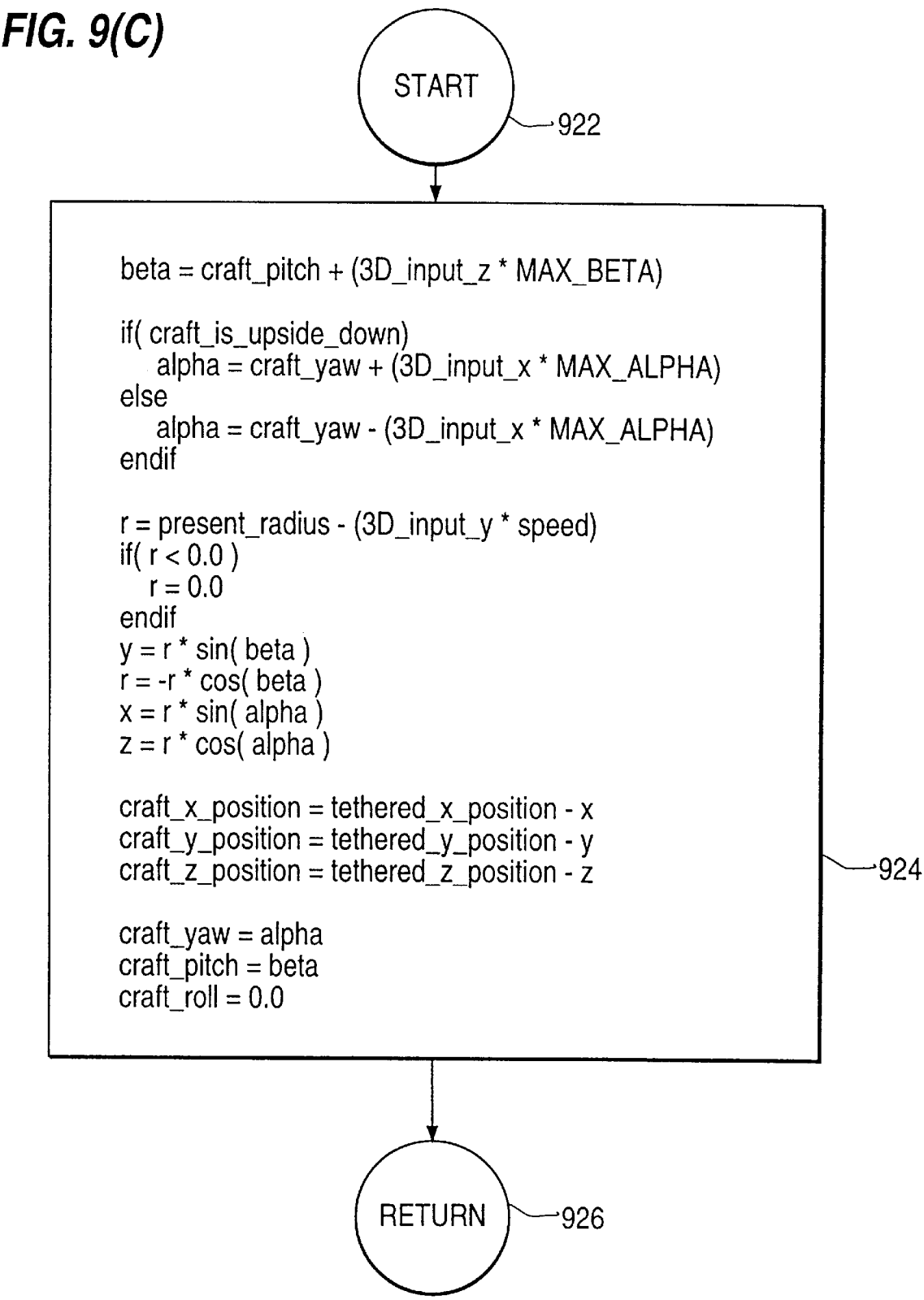
FIG. 9(C) is an illustration of the MUSE tethercraft algorithm.
Figure 9E:
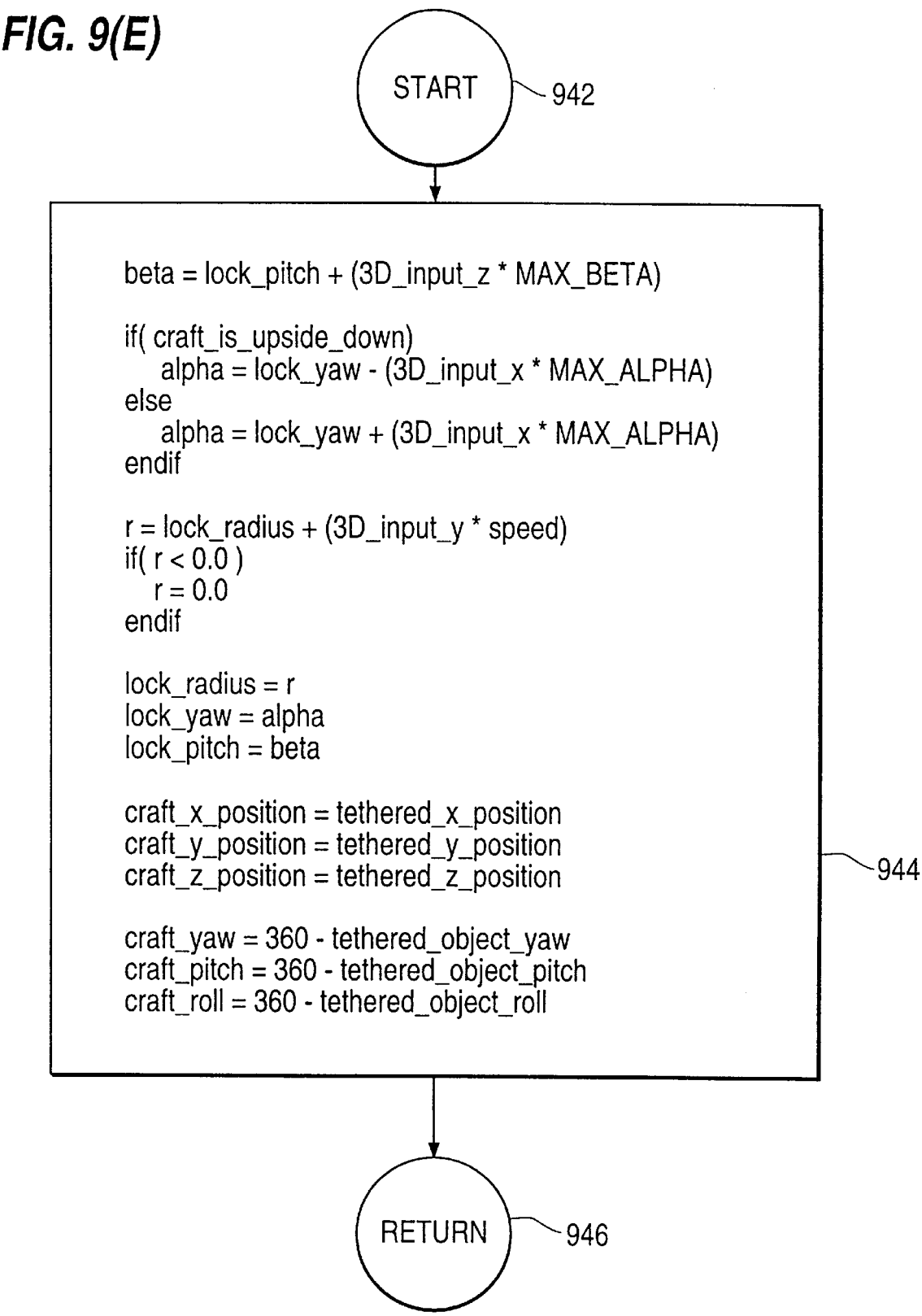
FIG. 9(E) is an illustration of the MUSE transformcraft algorithm.

The MUSE tethercraft algorithm 810C of FIG. 9(C) links the craft 400 to a tethered object which may be defined by the application program, model or data 18 or the MUSE system. When a command to tether is give while the tether extremity 422 of the track and tether reference line 420 is juxtaposed to an object in the synthetic environment, the craft tethers to the object so that the craft moves in synchronism with the object. This is accomplished by extending an acquisition cone 460 from the tether extremity 422 of the tether reference line 420. If an object or objects are found within that acquisition cone, then the craft will select the object first found closest to the center of the cone and will attach the craft to the geometrical center or origin of this object. The craft can be viewed as if it were attached to this object by a stiff rope. Accordingly, the craft will travel with the object through space.

The craft 400 may be turned about its tethered position so that the craft axis 418 is in any desired orientation. If the user directs the craft forward, the craft moves the user closer to the object, when the user directs the craft backwards, the craft moves the user further away from the object. When the user requests release from the tether, the craft will return to a horizontal orientation.

In the MUSE lockcraft algorithm 810D of FIG. 9 (D), the craft functions similarly to the tethercraft. The lockcraft algorithm should be accessed while in the tethercraft mode. When the lockcraft is selected, the craft is aligned to the tethered object's inertial reference frame so that the craft will travel through space with the object and will receive the same inertial inputs as the object. For example, if the object is rotating, the craft will rotate in geosynchronous orbit with the object.

In the MUSE transformcraft algorithm 810E of FIG. 9 (E), the craft transitions along the tether line to the objects surface and pivots until the craft is tangential to the attachment line. The transform craft is accessed from the tethercraft mode and places the user's view on the surface of the object looking out over the horizon created by the object. The user may then turn the craft left and right and go forward and backward, up away from the surface, and back down to the surface.

Figure 9F:
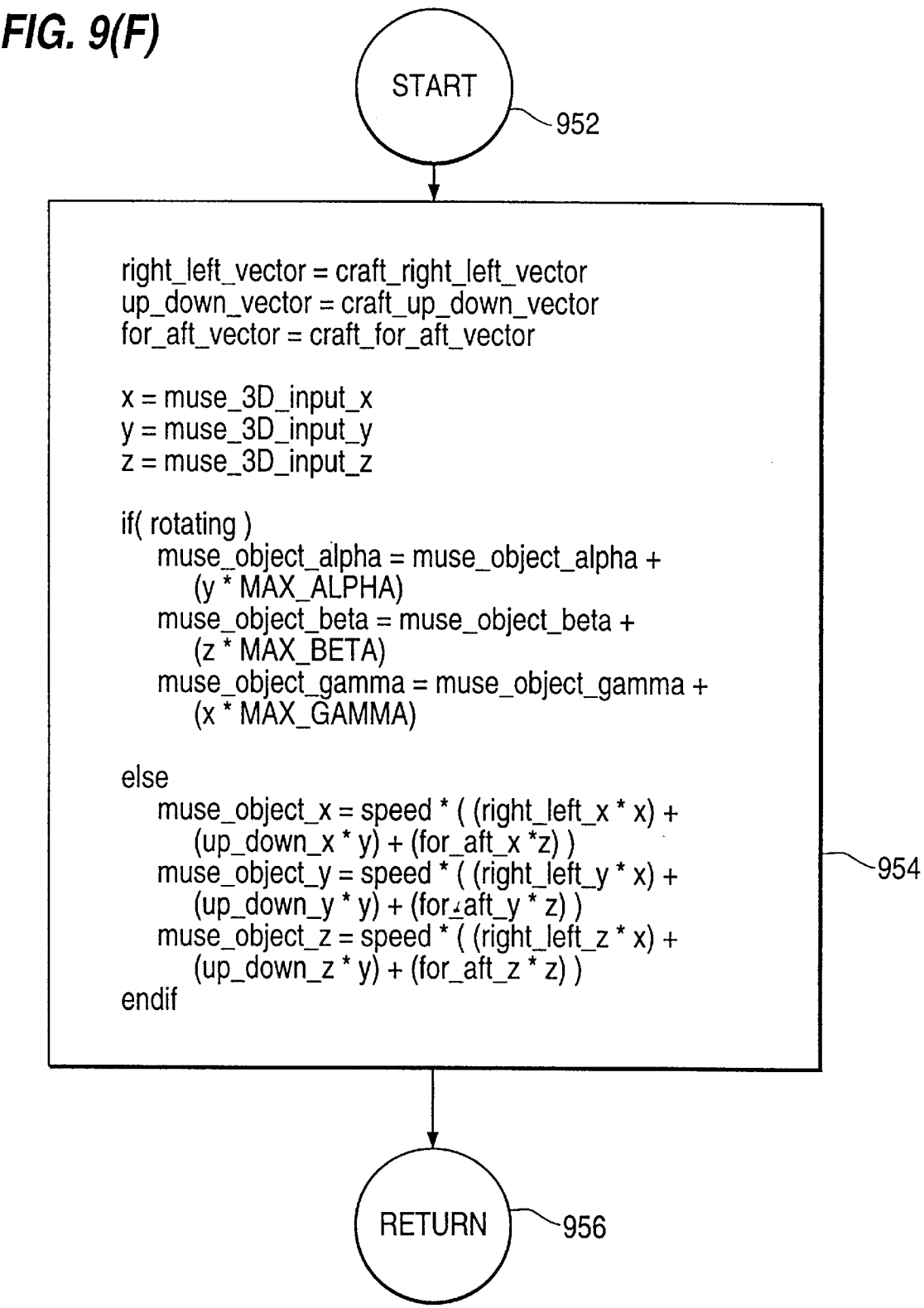
FIG. 9(F) is an illustration of the MUSE objectcraft algorithm.
Figure 9G:
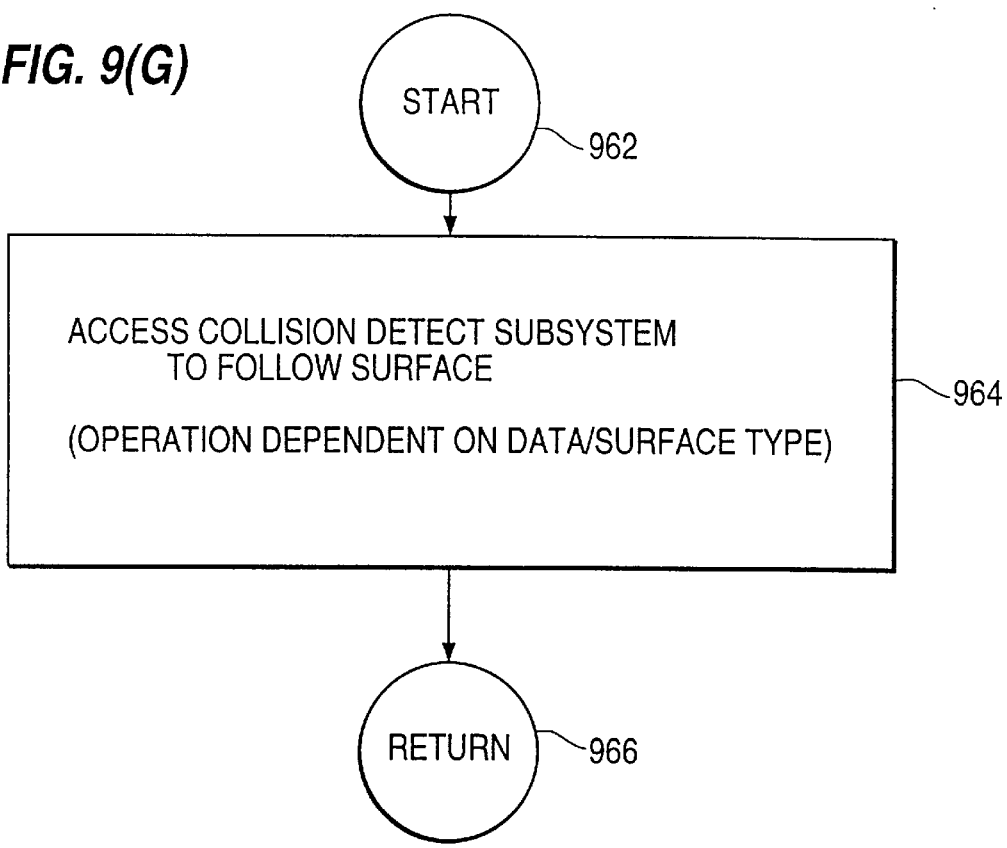
FIG. 9(G) is an illustration of the MUSE groundcraft algorithm.

In the MUSE objectcraft algorithm 810F of FIG. 9(F), while the craft is tethered, a user may request that the object be controlled. While the object is being controlled, the craft remains stationary. When the object is directed to translate, the object translates relative to the craft's inertial reference frame. When the object is directed to rotate, the object is translated to the origin of the craft's reference frame and rotated as directed by the user and then translated back to the point where it was translated from. When the user requests release of object control, the craft is transitioned back to the tethered state. The objectcraft of the present application is useful to enable the user to manipulate objects within the synthetic environment.

In the MUSE groundcraft algorithm 810G of FIG. 9 (G), the MUSE craft is programmed using known collision detection and surface following techniques to follow a surface within the synthetic environment. The MUSE groundcraft may turn left or right on the surface so as to navigate about the surface in a desired fashion, but the craft may not leave the surface while in the groundcraft mode.

Figure 9H:
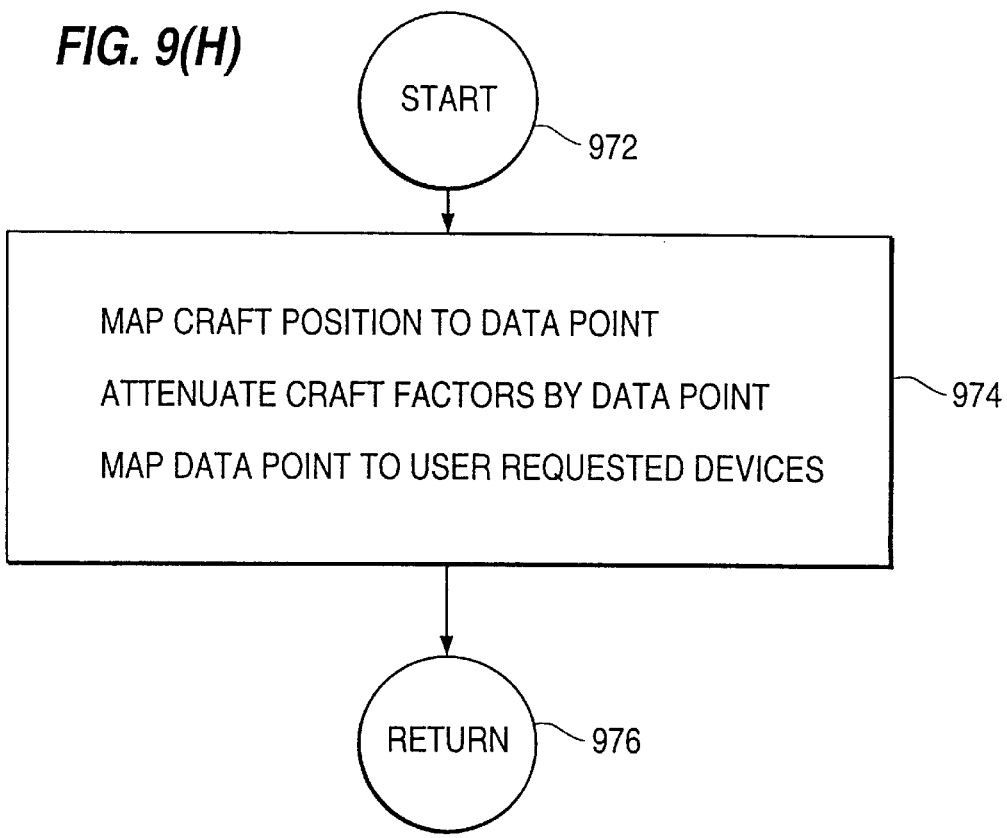
FIG. 9(H) is an illustration of the MUSE datacraft algorithm.

In the MUSE datacraft algorithm 810H of FIG. 9(H), the MUSE datacraft is controlled in accordance with data sampled from application supplied information. Data sampled from the synthetic environment is mapped to attenuate speed and acceleration values of the craft. The data may, of course, also be used to supply audio, tactile, or other output to the user including the provision of a desired display on the craft wall.

Figure 9I:
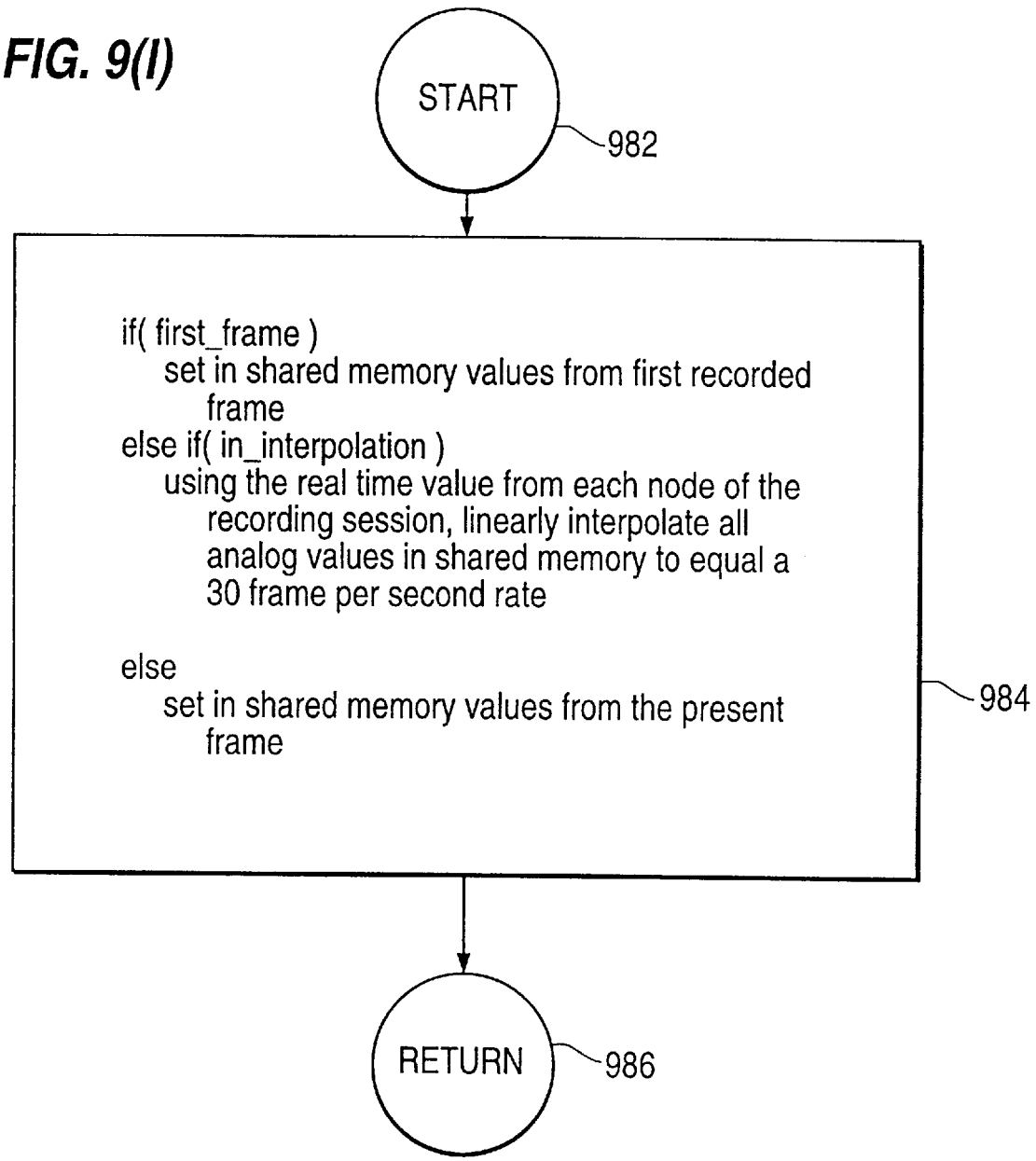
FIG. 9(I) is an illustration of the MUSE moviecraft algorithm.

In the MUSE moviecraft algorithm 810I of FIG. 9(I), the MUSE craft 400 follows a prerecorded "movie" repeating a craft path previously recorded by the virtual camera techniques of the MUSE system. Thus, the MUSE moviecraft repeats a craft path previously recorded.

Pointing and Object Identification

Object identification and pointing within the MUSE environment is accomplished in a similar manner to tethering as described above. As explained above, an acquisition cone 460 extending from the tether extremity 422 of the tether craft is used to request the identification of objects. The user may request object identification through the use of a generic functional command such as "label". If the object is found within the acquisition cone 460 extending from the tether extremity 422 of the tethercraft, the object will be named, typically by a speech synthesis output.

Any other method of pointing may also be utilized. A head tracking device may be utilized to control an imaginary line extending forward along the center of the viewpoint. The imaginary line then has an imaginary acquisition cone similar to 460 of FIG. 4(B) extending therefrom to allow object identification and manipulation utilizing the head tracked imaginary line.

Another method of pointing is to use a 6° of freedom spatial positioning and orientation device in order to control the imaginary line or wand in space, allowing the user to point the wand anywhere within the synthetic environment.

All of the above methods utilize different input devices but use a common search algorithm for determining what, in a synthetic environment, is being pointed at. The last two methods of pointing have the advantage that they may also direct the labelling function at instruments or other objects or artifacts displayed on the craft walls. Necessarily, the tether extremity 422 of the craft 400 is unable to perform this function.

Marking and Recording Information in the Synthetic Environment

The system of the present invention allows the user to mark any desired position within the synthetic environment. Typically, the position of the tether extremity 422 of the craft 400 is utilized to define a position for marking. Typically, the user requests the position to be marked and then selects an icon associated with that unique position within the N-dimensional environment. For example, if the user wishes to mark a point in the environment, the user might say "mark". A preselected icon representative of that position could then be displayed on one of the walls 412, 414 of craft 400. If later, when the user has navigated to a different point within the synthetic environment, the user wishes to return to the marked position, the user need only access the icon representative of that position or orally request transport to that position to return to the position within the N-dimensional environment. Thus, a user may "teleport" from one position (or time) within the synthetic environment to another.

One important objective of the MUSE system is to allow a user to explore and understand the information or model contained in the synthetic environment. Frequently, however, a user may wish to collect information from the synthetic environment. This recordation of information from the synthetic environment is enabled in the MUSE system of the present invention through the use of a "virtual camera". The virtual camera is a MUSE feature which is enabled by the user to record the output information supplied to the user at any instant in time. With respect to visual information, the virtual camera records the display view of the synthetic environment provided the user. The virtual camera may also, however, record other data outputs such as audible or tactile outputs as well. The virtual camera of the present application has two modes. In the first mode, the virtual still mode, the user simply presses a selected button and a digital "picture" of the outputs at that time instant are recorded. A new "picture" is stored each time the button is pressed. After a session, a user can view the pictures, discard those not wanted, and save the final files in whatever format is desired. Finally, the visual "pictures" can be printed as desired. In the virtual still mode, the "picture" is a record of the information provided the video display. In the virtual still mode, all MUSE parameters need not be retained in the system of the present application.

The freedom of the N-dimensional motion offered by the MUSE system allows the user to compose pictures from any desired perspective and viewpoint.

A second, virtual video mode, allows the user of the MUSE system to navigate about the synthetic environment and continuously record the data supplied the user by the MUSE system. When a button is depressed, this record is continuously made until the button is released. Thus, complete recordation of a desired user track through the synthetic environment is attained.

In the virtual video mode of the present application, the MUSE system, during the time that the virtual video mode is toggled on, records all states within the shared memory on a frame by frame basis so that the entire history of the user's navigation through the N-dimensional synthetic environment is recorded. When the virtual video mode is invoked by the user in realtime, the path and user perspective are replayed throughout the time period that the virtual video mode was toggled on. Further, all non-video outputs are also recorded so that a complete record of the audible, force, and other outputs produced by the application program 18 during virtual video generation are retained. As an alternative, the virtual video techniques of the instant application can be used to enable a user to record a craft track, which craft track can later be repeated while the user concentrates on controlling or varying the user's perspective.

The virtual video recorded according to the present invention, may be processed in non realtime to create a highly detailed frame by frame animation with much smoother motion and more realistic rendering of the graphics, if desired.

MUSE Frame Generation

Figure 10:
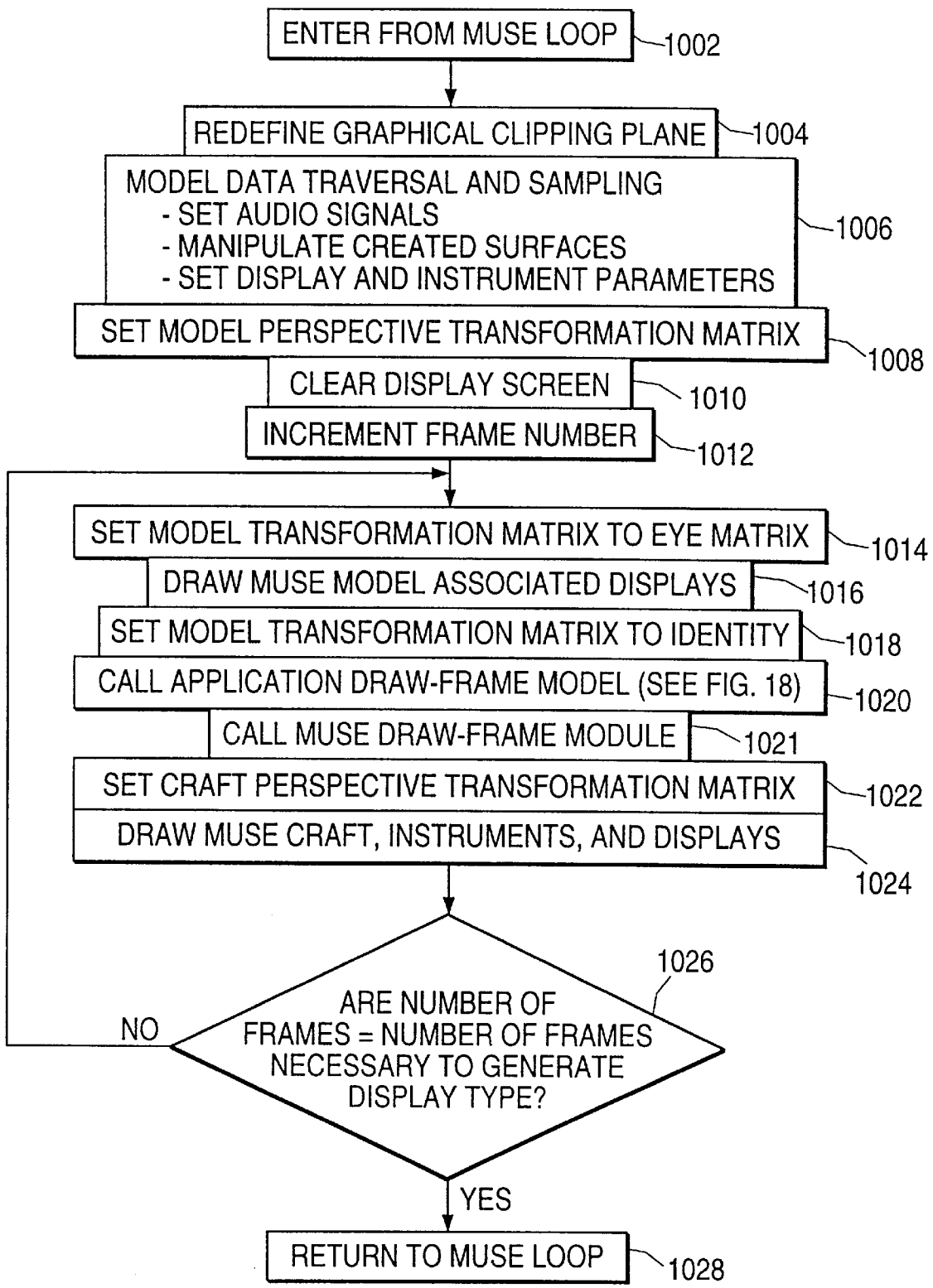
FIG. 10 is an illustration of the MUSE frame generator accessed in step 706 of the MUSE Loop algorithm 700 which develops a perspective view of the data illustrated by the MUSE system.

The MUSE frame generator algorithm 1000 of FIG. 10 assembles a perspective frame viewing the craft 400 and synthetic environment from the user's viewpoint and perspective. The MUSE frame generator algorithm is accessed by the MUSE loop 700 at step 1002. In step 1004, the graphical clipping planes are defined. The graphical clipping planes are defined by the least and greatest distances provided the MUSE shell 600 by the application program 18 in step 602 of FIG. 6. The graphical clipping planes are frequently redefined during the MUSE process as objects to be viewed move closer and farther from the user's viewpoint. For example, the least distance is redefined to ensure that the closest objects to the viewer will still be farther from the user than the near graphical clipping plane while the greatest distance is defined to ensure that the farthest objects of interest within the synthetic environment are within the greatest distance clipping plane. However, it is desirable to set these two planes as close together as reasonably possible so as to enhance image resolution within the two clipping planes, since such image resolution is dependent upon a fixed number of processing bits, which is 32 bits in the preferred embodiment. In step 1006, the MUSE frame generator algorithm performs model data traversal and sampling to set any desired audio signals, manipulate created objects and surfaces within the model, and set display and instrument parameters to their current values. Accordingly, step 1006 updates changing model parameters which will be within the viewed scene as well as model audio data which is varying.

Figure 11:
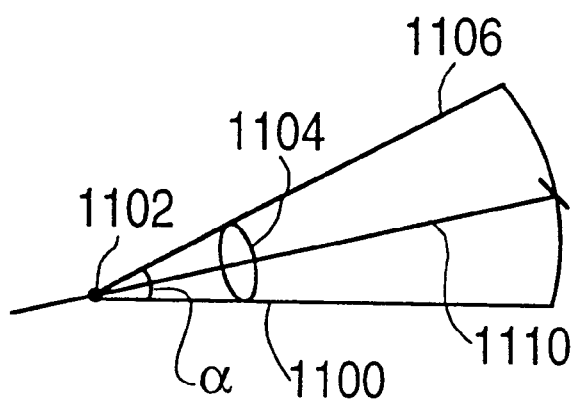
FIG. 11 is a representation of the shaped viewing volume defined by the model perspective transformation matrix developed by step 1008 of the MUSE frame generator algorithm 700.

In step 1008, the model perspective transformation matrix is defined. The model perspective transformation matrix defines a shaped viewing volume (generally indicated as 1100) which is illustrated in FIG. 11 and which may be thought of as a right frusto-pyramid having a square or rectangular cross section defining walls 1106 with an apex 1102, where the frustrum 1104 is defined by the least distance and the base 1108 is defined by the greatest distance while the angle of divergence of the pyramid α is defined by the viewing angle of the user. A cross sections of the frusto-pyramid are eventually fully projected on the display. The height and width of each cross-section are sized so that the shape of the shaped viewing volume corresponds to the shape of the selected display and is symmetrical about a viewing volume axis 1110. In other words, the model perspective transformation matrix established by step 1008 defines the volume within which objects will be displayed within a particular frame. Objects outside the frusto-pyramidal shaped viewing area 1100 defined by the model perspective transformation matrix developed in step 1008 will not be displayed in the associated video frame.

At step 1010, the display screen is cleared of a previous display image and at step 1012, the frame number is incremented. At step 1014, the model transformation matrix is set to the EYE matrix. This establishes the viewpoint and perspective of the user by locating the apex 1102 of the pyramid at the user's viewpoint and aligning the pyramid so that the viewing volume axis 1110 extends in the direction of the user's perspective of the scene.

In step 1016, a synthetic environment display image is produced by projecting the synthetic environment data within the shaped viewing volume 1100 into a suitable display format. For example, if a flat display is to be utilized, the shaped viewing volume 1100 will be projected on to a single flat image. If a stereoscopic imaging device (e.g., head-mounted display, goggles, etc.) is used, objects within the shaped viewing volume are displayed with a perspective which produces a stereoscopic image with the necessary perceptual depth clues by slightly shifting each of two images right and left with respect to the viewing axis to produce related images with slightly different perspective.

In step 1018, the model transformation matrix is set to identity to initialize graphics placement within the model as would be understood by one of ordinary skill in the art. In essence this ensures that the user's viewpoint is set to (0,0,0) and that the world will move past the viewpoint to reduce system processing requirements.

Figure 18:
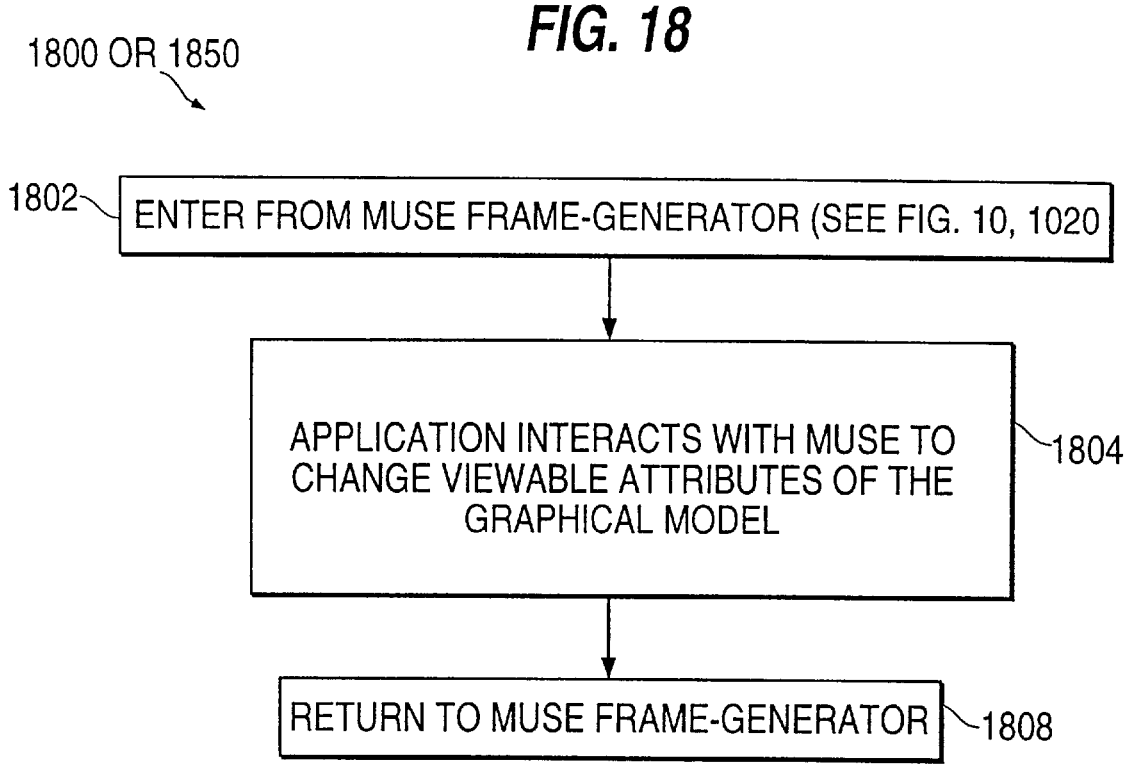
FIG. 18 is a flow chart illustrating the application drawframe module 1800 accessed at step 1020 of FIG. 10 and provided by a MUSE application 18 in the system of the present application.

At step 1020, the application draw-frame module generally indicated as 1800) is called as illustrated in FIG. 18. The application draw-frame module 1800 is provided within the application 18 and monitors the application to change viewable attributes under application program control as will be later described. In step 1021, the MUSE draw-frame module 1850 is called which is substantially identical to the module of FIG. 17 but is located within the MUSE system and changes viewable attributes of the graphical model under control of the MUSE system and events defined therein.

At step 1022, the craft perspective transformation matrix is defined. The craft perspective transformation matrix is similar to the model perspective transformation matrix except that the shaped viewing volume 1100 is on a scale much closer to the user where the least distance is near zero and the greatest distance extends to just beyond the dimensions of the craft. The viewing angle α is the same for the shaped viewing volume defined by craft perspective transformation matrix as it is for the model perspective transformation matrix. Accordingly, the craft perspective transformation matrix defines a shaped viewing volume having a conical surface co-extensive with the conical surface of the shaped viewing volume of the model perspective transformation matrix, but substantially closer to the apex of the right circular pyramid defining the volume of the model perspective transformation matrix.

Figure 13:
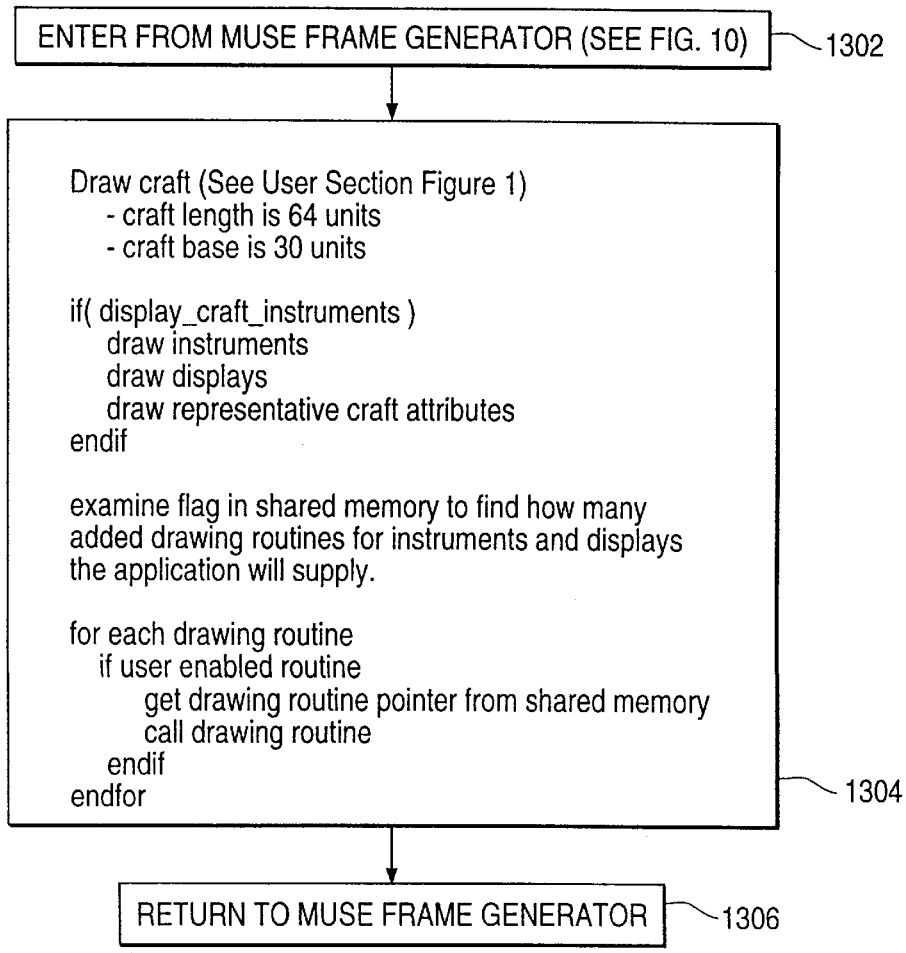
FIG. 13 is an illustration of the craft drawing algorithm utilized in the MUSE system of the present application.

As step 1024, the MUSE frame generator algorithm 1000 accesses the MUSE craft drawing algorithm 1300 of FIG. 13 to draw the MUSE craft, instruments, and displays with the perspective defined by the projection of the shaped viewing volume in a manner substantially identical to the manner in which the synthetic environment display image is drawn in steps 1016.

At step 1026, after the MUSE craft instruments and displays are drawn, the MUSE frame generator algorithm determines whether the total number of frames necessary to generate the selected display type have been developed. In other words, in a stereoscopic image, two frames having slightly displaced user viewpoints are developed to produce the stereoparallax necessary to perceive distance. In such a case, then two image frames will be generated within a single display frame. If the number of frames equals the number of frames necessary to generate the desired display type in step 1026, the system returns to the MUSE loop 700
of FIG. 7 in step 1028. Otherwise, steps 1014–1024 are repeated for the second display frame necessary to produce a complete display image.

MUSE Event Handling

The MUSE event handler algorithm 1200 of FIG. 12 is accessed from the MUSE loop algorithm of FIG. 7 at step 1202. At step 1204, the MUSE event handler algorithm 1200 reacts to the application layer of shared memory 200 which is a buffer between the MUSE application shell algorithm 600 and the application program, model or data 18 of FIG. 1. The information stored within the application layer of shared memory defines the craft type, functionality events to functionality toggles, and display parameters through display toggles. At step 1206, the MUSE event handler algorithm 1200 calls the application event handler module 1900 of FIG. 19 which is a part of the MUSE application program and accesses the application data to exchange application information in MUSE state as well as to provide triggers from MUSE to toggle the application's specific functionality. Upon occurrence of a specific triggering event, the application event handler module might invoke some desired optional functionality, operating in substantially the same way as the MUSE event handler 1200. For example, if an object has been moved, MUSE tells the event handler module which object has been moved by the user and where it has been moved to.

At step 1906, the application event handler module 1900 of FIG. 19 returns to the MUSE event handler 1200 of FIG. 12. At step 1208, the MUSE event handler algorithm 1200 returns to the MUSE loop algorithm 700 of FIG. 7.

MUSE Craft Drawing

The MUSE craft drawing algorithm (generally indicated as 1300) of FIG. 13 is accessed from the MUSE frame generator of FIG. 10 at step 1302. At step 1304, the MUSE craft drawing algorithm draws the craft, instruments, displays, and other craft attributes. Further, the MUSE craft drawing algorithm as step 1304 accesses a flag in shared memory 200 to determine the number of drawing routines for instruments and displays to be supplied by the application 18. Each of these drawing routines of the application program, model or data 18 are then, in turn, accessed in step 1304. In step 1306, the MUSE craft drawing algorithm returns to the MUSE frame generator.

The MUSE Application

Figure 14:
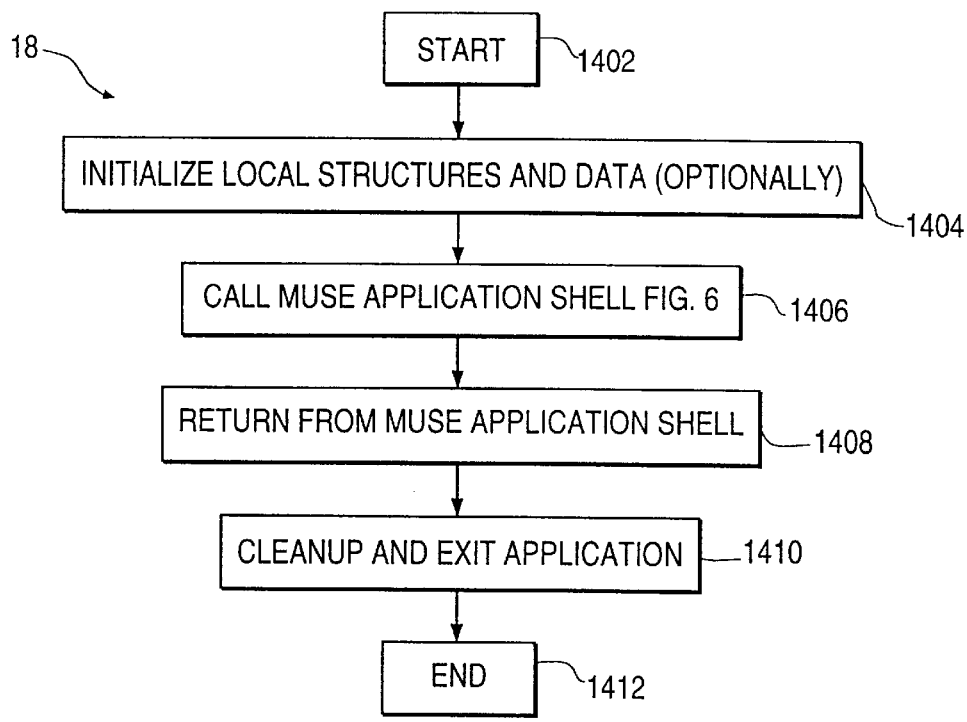
FIG. 14 is a flow chart illustrating the manner in which an application program would access MUSE.

FIG. 14 illustrates an exemplary application algorithm 18 for use in the MUSE system of the present application illustrating the manner in which such an application algorithm 18 interfaces generally with the MUSE system of the present invention. The application will typically initialize local structures and data within the application program, model or data 18 in step 1404. At step 1406, the application program then calls the MUSE application shell 600 at step 1406 where the application provides the MUSE shell 600 with the information described with reference to step 602 of FIG. 6. After providing the MUSE shell 600 with this information, the application then supplies the application modules of FIGS. 15-19 for access by the MUSE system as will be described herein below. Upon completion of MUSE manipulation within the synthetic environment via the MUSE system of the present invention, the exemplary MUSE application algorithm will clean up and exit the application at step 1410.

The application initialization module (generally indicated as 1500) of FIG. 15, which should be a part of a MUSE application 18 of FIG. 14 is accessed from the MUSE shell of FIG. 6 at step 610. The application specific data structures may be either initialized prior to MUSE access in step 1404 of FIG. 14, or, alternatively, may be initialized at step 1504 of FIG. 15 after access from the MUSE shell 600. The application initialization module 1500 of the application program, model or data 18 then initializes MUSE functionality by setting flags into the application portion of shared memory 200 and performing routine calls enabling particular MUSE functionality. Typically, the application initialization module 1500 will set the craft default type to one of the crafts described in FIGS. 9(A)–9(I) of the present application, or, alternatively, will supply an application program supported craft algorithm specific to the application program. A default starting location for the craft will also be provided by the application initialization module.

At step 1508, the application initialization module initializes application graphics by defining a light or illumination model or models for the synthetic environment, and texturing the environment in a desired manner by defining materials and textures for objects within the environment. At step 1510, initialization of the MUSE system by the application is completed and control is returned to the MUSE shell 600.

Figure 16:
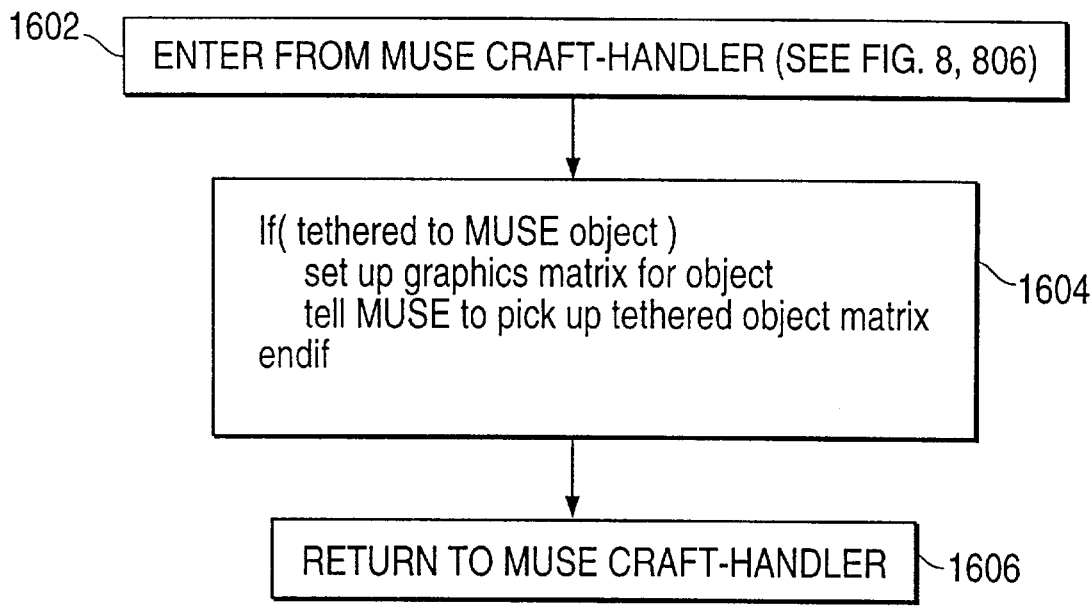
FIG. 16 is a flow chart illustrating the application preposition pre-frame module accessed at step 804 of FIG. 8 and provided by a MUSE application 18 in the system of the present application.

FIG. 16 illustrates the MUSE pre-position pre-frame module contained within the MUSE system. The MUSE pre-position pre-frame module supplies MUSE with pre-position pre-frame information describing how the craft 400 is interacting with objects. Pre-position as used in this application refers to action which occur before the positioning of the craft within the synthetic environment is determined. Pre-frame refers to events which occur before the video frame is developed.

In step 1602, the MUSE craft handler 800 of FIG. 8 accesses the MUSE pre-position pre-frame module 1600 from step 804. In step 1604, the MUSE pre-position pre-frame module 1600 determines if the craft is tethered to a MUSE generated object. If the craft is tethered to an MUSE generated object, the motion of the application object is provided to MUSE through the use of a graphics matrix for the object which is supplied to the MUSE craft handler 800. In step 1506, the MUSE pre-position pre-frame module 1600 returns control to the MUSE craft handler 800 of FIG. 8.

In FIG. 8, in addition to the MUSE pre-position pre-frame module 1600, an application pre-position pre-frame module 1650 is also accessed. This application pre-position pre-frame module 1650 is substantially identical to the MUSE pre-position pre-frame module but is included within the application program 18 and determines the graphics matrix of an object defined by data within the MUSE application program 18. The application pre-position pre-frame module determines if the craft is tethered an object created by the application data. Otherwise, operation of the application pre-position pre-frame module 1600 is substantially equivalent to the MUSE pre-position pre-frame module 1650.

The application post-position pre-frame module 1700 is an application program, model or data 18 program module which is entered at step 1702 from the MUSE craft handler 800 of FIG. 8 after craft position is updated by one of the algorithms of steps 810A–810J. In step 1704, the application post-position pre-frame module 1700 then accesses application program, model or data 18 functionality which triggers program events when the craft reaches a pre-selected point and/or a predetermined time event occurs. Upon determination of this functionality when the craft reaches a pre-selected position or a pre-selected time is reached, the control is returned to the MUSE craft handler at step 1706. The application post-position pre-frame module also advises the application of the position of the craft so that the application 18 will implement desired events upon the attainment of a given position or at a given time.

The MUSE post-position pre-frame module 1750 accessed at step 820 of FIG. 8 is substantially identical to the application post-position pre-frame module except that it is contained within the MUSE system. Accordingly, functionality within the MUSE system is accessed by craft attainment of a particular position and/or attainment of a particular time. However, the MUSE post-position pre-frame module 1750 is not substantially different from the application post-position pre-frame module 1700 illustrated in FIG. 17.

The application draw frame module, while part of the MUSE application, has already been explained hereinabove in the MUSE frame generation section of the present application.

FIG. 19 of the instant application illustrates the application event-handler module which is a part of a MUSE application developed according to the teachings of the present application and which is entered from the MUSE event-handler of FIG. 12 at step 1902. In step 1904 the application interacts with MUSE to exchange application information and MUSE state as well as to receive triggers from MUSE to toggle application specific functionality in step 1904. In other words, triggers generated with the MUSE system are provided to the application to trigger application originated functionality while application events are provided by the application to MUSE which application events may trigger MUSE functionality. At step 1906, the application event-handler module 1900 returns to the MUSE event handler 1200 of FIG. 12.

It is apparent from the above presented detailed description that the MUSE system of the present invention provides a substantially improved system for presentation, exploration, navigation, manipulation and examination of a synthetic environment. Such a synthetic environment is typically a three-dimensional environment but may be any N-dimensional environment as is necessary to produce the desired data model. The system of the present invention allows a user to more easily navigate through the synthetic environment by providing visual perceptual clues to the user and by allowing user mapping of input output devices in a flexible fashion to enhance information transfer to the user and to render the application program device independent. Finally, the MUSE system of the present invention provides the ability to display a MUSE craft in close proximity to the user viewpoint without significantly degrading the detail of the displayed synthetic environment.

The numerous advantages of the present application and the important features thereof will become even more apparent through the appended claims. It should be understood that the scope of the present invention is not limited by the description presented hereinabove but is defined solely by the appended claims. Modification, alteration, and elaboration on the techniques of the present application as would occur to one of ordinary skill in the art are within the contemplation of the Inventors.

We claim:

1. A method of examining and manipulating any data of three or more dimensions using a synthetic environment data accessing program surrounding and interfacing with said data comprising:

a) providing a user with desired input/output devices producing input device commands and responding to output device commands;

b) a user manipulating said input devices to generate input device commands;

c) translating the input device commands into device independent input commands independent of device characteristic or type for enabling/disabling functionality within said synthetic environment data accessing program or said data;

d) the user navigating through said data or manipulating portions of said data using said device independent input commands;

e) at least one of said data and said synthetic environment data accessing program developing device independent output commands independent of device characteristic or type including data perception output commands intended to supply the user with information about said data;

f) said synthetic environment data accessing program translating said device independent output commands into output device commands;

g) said output devices responding to said output device commands and supplying the user with a user perceivable representation of said data;

said user, by supplying input device commands, navigating through said data, exploring said data and manipulating said data as desired independent of said data or input/output device type to thereby improve user understanding of said data;

wherein said data may include one or more application programs.

2. The method of claim 1 wherein said output devices are selected from the group consisting of visual displays, sound generators, and force or tactile feedback devices.

3. The method of claim 1 wherein said data is multi-variant data.

4. The method of claim 1, wherein said data models a physical system.

5. The method of claim 1, wherein said synthetic environment data accessing program includes a shared memory for storing said device independent input and output commands.

6. The method of claim 1, wherein said output commands include output commands representative of image data for display to the user.

7. The method of claim 1, wherein said synthetic environment data accessing program maps the device independent input and output commands to desired input device commands and output device commands so that said steps c) and f) of translating may be easily adapted to available input/output devices.

8. The method of claim 7, wherein said synthetic environment data accessing program maps the device independent output commands to output commands associated with desired output devices intended to communicate to plural user senses.

9. The method of claim 1, wherein said output devices include a visual display, said method further comprising overlying synthetic environment data accessing program generated perceptual information over the data generated perceptual information to enhance the understanding of said data.

10. The method of claim 9, wherein the synthetic environment data accessing program generated perceptual information includes adding a craft into the viewed scene.

11. The method of claim 10, wherein said method includes the step of storing and accessing one or more library programs which are independent of said data and supplied through the synthetic environment data accessing program.

12. The method of claim 11, wherein said library programs include correlation filters and transformations.

13. The method of claim 11, wherein said synthetic environment data accessing program generated perceptual data includes a visual image of a craft positioned around the user perspective of the data.

14. The method of claim 13, wherein said library programs include a tether program which couples the craft to a selected object within said data so that said craft moves with said object.

15. The method of claim 13, wherein said craft has walls on which additional data may be displayed.

16. A synthetic environment data accessing system including a synthetic environment data accessing program surrounding and interfacing with data of three or more dimensions for enabling the examination and manipulation of said data comprising:

input/output devices producing input device commands and responding to output device commands;

an input device handler translating the input device commands into device independent input commands independent of device characteristic or type for enabling/disabling functionality within said synthetic environment data accessing program or said data;

a shared memory storing said device independent input commands;

at least one of said data and said synthetic environment data accessing program developing device independent output commands independent of device characteristic or type including data perception output commands intended to supply the user with information about said data and supplying said device independent output commands to said shared memory;

an output device handler translating said device independent output commands stored in said shared memory into output device commands, said output devices responding to said output device commands and supplying the user with a user perceivable representation of said data;

said user, by supplying input device commands, navigating through said data, exploring said data and manipulating said data as desired independent of said data or input/output device type to thereby improve user understanding of said data;

wherein said data may include one or more application programs.

17. The synthetic environment data accessing system of claim 16, wherein said data is multi-variant data.

18. The synthetic environment data accessing system of claim 16 wherein said data models a physical system.

19. The synthetic environment data accessing system of claim 16, wherein said synthetic environment data accessing program maps the device independent output commands to output commands associated to desired output devices intended to communicate with different user senses.

20. The synthetic environment data accessing system of claim 16, wherein said output devices include a visual display, said system further comprising overlying synthetic environment data accessing program generated perceptual information over the data generated perceptual information to enhance the understanding of said data.

21. The synthetic environment data accessing system of claim 16, wherein the synthetic environment data accessing program adds a craft into the viewed scene.

22. The synthetic environment data accessing system of claim 21, further comprising one or more library programs which are independent of said data and supplied through the synthetic environment data accessing program.

23. The synthetic environment data accessing system of claim 22, wherein said library programs include correlation filters and transformations.

24. The synthetic environment data accessing system of claim 23, wherein said synthetic environment data accessing program generated perceptual data includes a visual image of a craft positioned around the user perspective of the data.

25. The synthetic environment data accessing system of claim 24, wherein said library programs include a tether program which couples the craft to a selected object within said data so that said craft moves with said object.

26. The synthetic environment data accessing system of claim 16, wherein said output devices are selected from the group consisting of visual displays, sound generators, and force or tactile feedback devices.

* * * * *